United States Patent [19]
Kato et al.

[11] Patent Number: 5,610,338
[45] Date of Patent: Mar. 11, 1997

[54] ROLLING OR TILTING RESPONSIBLE SWITCH

[75] Inventors: Harunori Kato, Mie-ken; Yasukazu Mizutani, Nagoya; Shigekazu Shibata, Nagoya; Katsuhiro Kimura, Nagoya; Hideki Koseki, Aichi-ken; Mitsuhiro Urano, Toyota; Masayuki Watanabe, Nagoya, all of Japan

[73] Assignee: Ubukata Industries, Nagoya, Japan

[21] Appl. No.: 559,948

[22] Filed: Nov. 17, 1995

Related U.S. Application Data

[62] Division of Ser. No. 121,522, Sep. 16, 1993, abandoned.

[30] Foreign Application Priority Data

Sep. 16, 1992 [JP] Japan .................................. 4-272387
Oct. 29, 1992 [JP] Japan .................................. 4-316363
Jan. 20, 1993 [JP] Japan .................................. 5-026308

[51] Int. Cl.$^6$ .............................................. G01P 15/135
[52] U.S. Cl. .......................... 73/652; 340/690; 367/178; 200/61.45 R; 200/61.47; 200/61.5
[58] Field of Search ........................ 73/652, 654, 493; 340/690; 200/61.45 R, 61.47, 61.5; 367/178

[56] References Cited

U.S. PATENT DOCUMENTS

| | | | |
|---|---|---|---|
| 3,818,160 | 6/1974 | Hitchcock | 200/61.45 |
| 3,916,127 | 10/1975 | Roesch et al. | 200/61.45 |
| 4,001,185 | 1/1977 | Mitsui et al. | 200/61.45 R |
| 4,185,651 | 1/1980 | Paulson | 200/61.45 |
| 4,493,066 | 1/1985 | Ubukata et al. | 367/178 |
| 5,237,135 | 8/1993 | Wolski | 200/61.45 |
| 5,396,223 | 3/1995 | Iwabuchi et al. | 73/654 |
| 5,408,457 | 4/1995 | Fujino et al. | 367/178 |

FOREIGN PATENT DOCUMENTS

| | | |
|---|---|---|
| 63-29286 | 6/1988 | Japan . |
| 64-79624 | 3/1989 | Japan . |
| 2-186224 | 7/1990 | Japan . |

*Primary Examiner*—Hezron E. Williams
*Assistant Examiner*—Rose M. Finley
*Attorney, Agent, or Firm*—Foley & Lardner

[57] ABSTRACT

A roll or tilt responsive switch includes a housing formed from an electrically conductive material and having an inclined face formed on the bottom to gradually rise concentrically outwardly substantially from the center of the bottom, and a header fixed to the housing to close its open end and having a through-aperture in which a terminal pin is fixed in an insulated relation. A contact is fixed to an end of the terminal pin located inside the housing and has a plurality of feather portions each having a predetermined elasticity and disposed concentrically with the terminal pin. An inertia ball is enclosed in the housing to be located substantially at the center in the housing in a normal position of the switch in a stationary state. The inertia ball rolls when subjected to oscillations, so that the inertia ball slides on the feather portions of the contact except for distal ends of the feather portions such that the inertia ball electrically conducts between the contact and the housing and such that the feather portions are elastically deformed, thereby receiving a force pushing the inertia ball against the bottom of the housing.

18 Claims, 10 Drawing Sheets

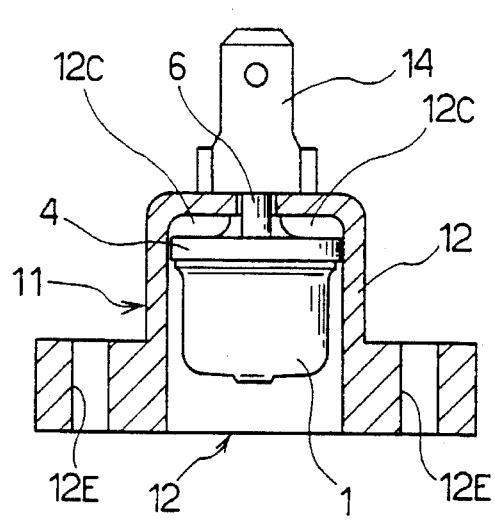
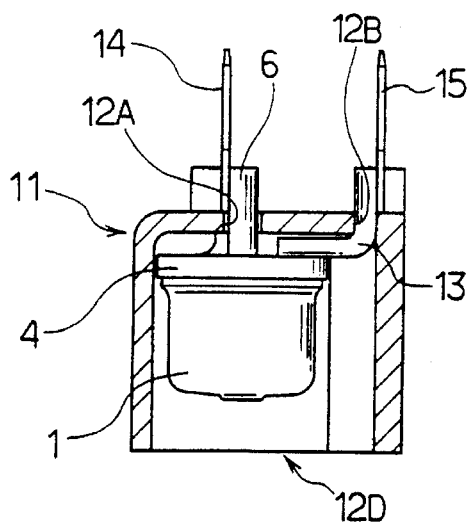
FIG.5  FIG.6
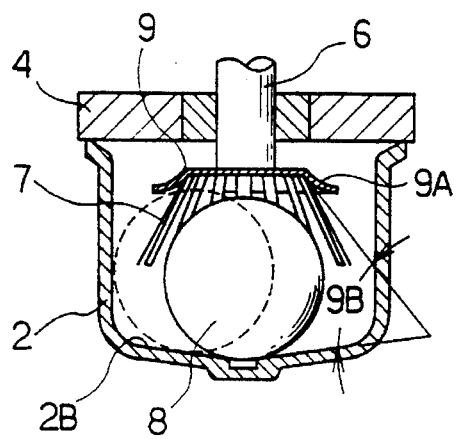
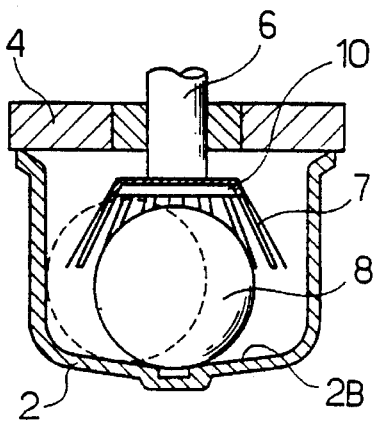
FIG.7  FIG.8
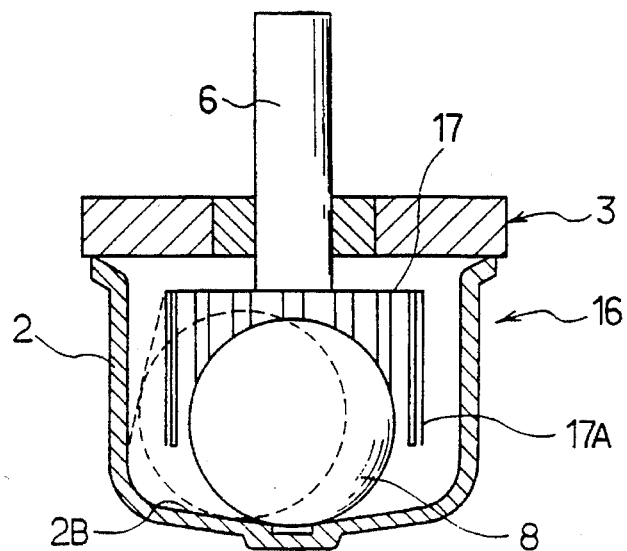
FIG.9

ROLLING OR TILTING RESPONSIBLE SWITCH

This application is a division of application Ser. No. 08/121/522, filed Sep. 16, 1993 now abandoned.

BACKGROUND OF THE INVENTION

1. Field of the Invention

This invention relates to a rolling or tilting responsive switch mounted on an automatic shutoff valve having an integrated microcomputer and employed in a city gas equipment and a commercial propane gas equipment or mounted on control devices of oil space heaters, gas burning appliances and electrical equipment, for detecting oscillations such as an earthquake to thereby supply a detection signal to the automatic shutoff valve or the control devices.

2. Description of the Prior Art

The prior art has proposed various types of seismosensitive device. Japanese Laid-open Patent Application (Kokai) No. 63-29286 (1988), which will be referred to as "first reference," discloses a seismosensitive device wherein a seismosensitive ball drives a first contact in response to an earthquake of a predetermined seismic intensity to cause the same to be engaged with a second contact. The seismosensitive ball is designed to automatically maintain its horizontal state in a casing. Japanese Laid-open Patent Application (Kokai) No. 2-186224 (1990), which will be referred to as "second reference," discloses a seismosensitive device wherein a seismosensitive ball rolls in a receptacle such that a movable contact suspended from over the ball is engaged with and disengaged from a fixed contact disposed in an inner casing. The receptacle is suspended in an outer casing with a liquid filled therein. Japanese Laid-open Patent Application (Kokai) No. 64-79624 (1989), which will be referred to as "third reference," discloses a seismosensitive device wherein a mercury globule is enclosed in a metal receptacle.

The seismosensitive devices have recently been mounted on automatic shutoff valves having an integrated microcomputer and employed in a city gas equipment and commercial propane gas equipment. Oscillations due to an earthquake or the like are detected by the seismosensitive device, which thereby generates a detection signal. The signal is supplied to the automatic shutoff valve so that necessary countermeasures are taken. In these valves, the oscillations due to the earthquake need to be distinguished from an oscillation caused by collision of a flying object with the valve and an artificial noise caused by driving of a dump truck or the like, civil engineering works and the like. For this purpose, the seismosensitive device is required to have predetermined operating characteristics in a frequency band of the oscillations due to the earthquake and different operating characteristics in the other frequency band. The above-mentioned first reference discloses nothing about this requirement. More specifically, in the disclosed seismosensitive device, the movable contact is held between the fixed contact and the ball serving only as the driving source of the movable contact when the movable contact is engaged with the fixed contact. Actually, however, the substantial collision of the ball with the fixed contact, both members being rigid bodies, takes place and a resultant repulsion causes the ball and the movable contact to instantaneously depart from the fixed contact. This construction cannot ensure a desirably long contact time period and accordingly, the duration of an "on" signal cannot be rendered long enough when the seismosensitive device serves as a switch. Thus, the oscillations due to the earthquake cannot be distinguished from that due to the artificial noise or electrical noise when the device disclosed in this reference is employed for detecting the oscillations due to the earthquake.

The movable contact is suspended with a point of support slightly higher than the center of gravity of the seismosensitive device disclosed in the above-mentioned second reference, which increases the number of parts and complicates the construction of the seismosensitive device. Consequently, it is difficult to assemble and miniaturize the seismosensitive device. Furthermore, this seismo-sensitive device cannot provide a long contact time period as in the device of the first reference. The second reference discloses that the repulsion due to the collision of the movable contact with the fixed contact is absorbed by resilient members so that the contact is prevented from being instantaneous. However, this further increases the number of parts and complicates the construction. Although this reference also discloses that the seismosensitive ball can be rendered small since the movable contact is moved with the ball, a friction between the ball and the movable contact prevents the miniaturization of the ball. Additionally, the receptacle enclosing the ball is formed from an insulating material. Where the insulating material is a synthetic resin, organic contaminants which cause failure in electrical conduction between the contacts are apt to be produced. The production cost of the seismosensitive device is increased where the insulating material is a glass or ceramic. Furthermore, the rolling of the ball or the collision thereof with the movable contact deforms, particularly, projected or corner portions of the receptacle when the receptacle is formed from the synthetic resin. Consequently, initial operating characteristics cannot be achieved after some period of service.

The seismosensitive device employing the mercury as disclosed in the third reference is a high-performance switch having characteristics matching with control by means of a microcomputer and providing a stable performance for a long period of time. However, a seismosensitive device wherein the mercury is not employed has recently been desired from a view of protection against environmental contamination.

In view of the foregoing, a small-sized, rigid, cost-effective seismosensitive device suitable for the mass production has been desired. The mercury should not be employed in the seismosensitive device and yet, it should have the same operating characteristics as in those of the seismosensitive device employing the mercury. In this respect, however, the construction of the seismosensitive device employing the mercury globule cannot automatically be applied to the seismosensitive device wherein the solid conductive ball is employed, since the mercury globule is liquid.

SUMMARY OF THE INVENTION

Therefore, a primary object of the present invention is to provide a rolling or tilting responsive switch wherein a stable electrical contact between parts composing a contact pair can be ensured and a desired contact period of time can be stably achieved.

Another object of the invention is to provide a rolling or tilting responsive switch wherein the oscillations due to the earthquake can be clearly distinguished from that due to other noise.

Further another object of the invention is to provide a rolling or tilting responsive switch which is rigid, simple in construction and small in size.

To achieve these objects, the invention provides a rolling or tilting responsive switch comprising a housing formed from an electrically conductive material and having a bottom and an open end, the housing having in the bottom a central neutral recess and a rolling face around the recess such that the bottom is formed into the shape of a shelf. A header is fixed to the housing to close the open end thereof and has a through-aperture in which an electrically conductive terminal pin is fixed in an insulated relation with the header. A contact member is formed from an electrically conductive material and fixed to an end of the terminal pin located inside the housing. The contact member has a contact portion disposed concentrically with the terminal pin and a plurality of feather portions each having a predetermined elasticity. An inertia ball enclosed in the housing to be located at the recess of the housing bottom in a normal attitude thereof in a stationary state by gravity such that the inertia ball is prevented from being brought into contact with the contact member. The rolling face of the bottom of the housing is formed so that the same rises concentrically outwardly from the center of the bottom thereof and so that a gradient thereof is decreased. The inertia ball is prevented from rolling on the rolling face of the housing bottom by the neutral recess thereof until the housing is tilted by a predetermined angle, thereby being disallowed to come into contact with the contact member. The inertia ball is allowed to depart the neutral recess to thereby roll on the rolling face when the housing is tilted above the predetermined angle, so that the inertia ball is brought into contact with the contact member, thereby electrically connecting the contact member to the housing.

According to the above-described rolling or tilting responsive switch, the inertia ball moves when subjected to the oscillations. The inertia ball slides on the feather portions of the contact member, elastically deforming them, thereby receiving the force pushing it against the housing bottom. This construction stabilizes the contact of the inertia ball with the contact member and the housing bottom. Consequently, the oscillations due to the earthquake can be distinguished from that due to the other noise since the electrical contacting operation can be stabilizes and a desired contact duration can be ensured.

In one preferred form, the rolling or tilting responsive switch further comprises a protector provided in the vicinity of a portion of the terminal pin where the contact member is secured and having a predetermined rigidity for preventing permanent deformation of the contact member due to collision with the inertia ball.

In another preferred form, a surface treatment is applied to a surface of the inertia ball and at least a portion of each of the contact member and the inner surface of the housing with which portion the inertia ball comes into contact, for permitting electrical conduction of the inertia ball and preventing said portion of each of the contact member and the inner surface of the housing from being damaged by an atmosphere in which the device is used.

In further another preferred form, the header seals the housing and a pollution preventing gas is contained in the sealed housing. Consequently, since the inertia ball and the inner face of the housing can be protected against corrosion and contamination, the rolling or tilting responsive switch can achieve stable operating characteristics for a long period of time.

In further another preferred form, the neutral recess has such a dimension that the inertia ball is allowed to roll on the housing bottom in a range defined by a peripheral wall of the neutral recess in a normal state of the inertia ball.

Other objects of the present invention will become obvious upon understanding of the illustrative embodiments about to be described with reference to the accompanying drawings. Various advantages not referred to herein will occur to those skilled in the art upon employment of the invention in practice.

BRIEF DESCRIPTION OF THE DRAWINGS

Several embodiments of the present invention will be described with reference to the accompanying drawings, in which:

FIG. 5 is a longitudinally sectional front view of a seismosensitive device incorporated with the seismosensitive element;

FIG. 6 is a longitudinally sectional side view of the seismosensitive device;

FIG. 7 is a longitudinally sectional view of the seismosensitive element of a second embodiment;

FIG. 8 is a longitudinally sectional view of the seismosensitive element of a third embodiment;

FIG. 9 is a longitudinally sectional view of the seismosensitive element of a fourth embodiment;

DETAILED DESCRIPTION OF THE PREFERRED EMBODIMENTS

Figure 1:
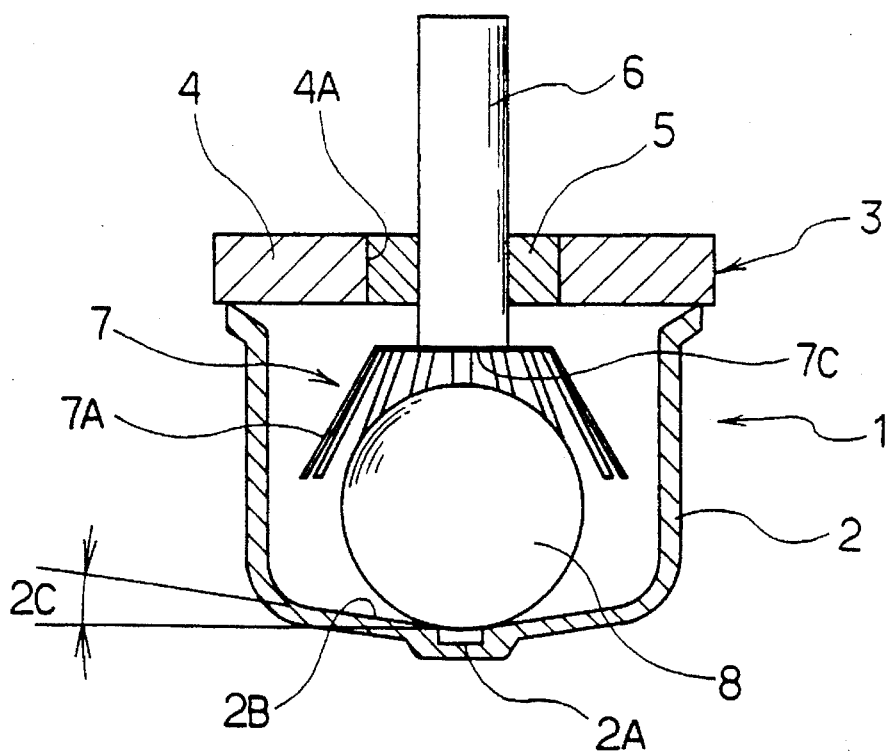
FIG. 1 is a longitudinally sectional view of a seismosensitive element of a first embodiment in accordance with the present invention.

A first embodiment of the invention will now be described with reference to FIGS. 1 to 6. FIG. 1 illustrates a seismosensitive element 1 employed in a seismosensitive device in accordance with the present invention. The seismosensitive element 1 comprises a housing 2 and a header 3 each formed from an electrically conductive material such as a metal. The housing 2 is formed into a cylindrical shape and has an open end and a bottom. The header 3 has an aperture 4A formed therethrough. An electrically conductive terminal pin 6 is fixed in the aperture 4A by an electrically insulative filler 5 such as glass or ceramic so as to extend therethrough. A contact plate 7 serving as a fixed contact is secured on one end of the terminal pin 6 located in the housing 2, by way of welding or the like. The contact plate 7 has a plurality of feather portions 7A radially extending from its center and each having a sufficient elasticity. An electrically conductive solid inertia ball 8 serving as a movable contact is enclosed in the housing 2. The inertia ball 8 may be formed from iron, stainless steel, copper, its alloy and hard lead. In this regard, the iron, copper and the like are easily oxidized in an atmospheric air and accordingly, there is a possibility that a resultant oxide film may spoil the electrical conductivity of the inertia ball 8. It is preferable that the surface of the inertia ball be treated with a noble metal such as gold or silver or by plating nickel or an alloy of lead and tin. The header 3 is secured to the housing 2 by way of a ring projection so as to close the open end thereof.

Air in the hermetically sealed housing 2 is discharged and instead, the housing 2 is filled by a volume of contamination preventive gas such as hydrogen, helium, argon or nitrogen so that the contact plate 7, the inertia ball 8 and the inner face of the housing 2 can be protected against corrosion and contamination, which results in achievement of stable operating characteristics for a long period of service.

The bottom 2B of the housing 2 includes an inclined face. The inclined face is a conical face obtained by turning a straight line with an inclination 2C in the embodiment. The shape of the inclined face should not be limited to this. For example, it may be a conical face whose inclination is varied en route. Furthermore, it may be a concave or convex face obtained by turning a curve with a vertically smooth curvature. The above-described inclination is defined as an angle of a straight line between a contact point of the inertia ball on the inclined face at a stationary position thereof and a contact point of the inertia ball on the inclined face at a position assumed by the inertia ball when it has rolled farthest. The curvature of each above-mentioned curve may be varied en route or gradually unless its direction of inclination changes.

The bottom face 2B of the housing 2 is provided with a central recess 2A serving as a rest portion for holding the inertia ball 8 in position until it is subjected to an oscillation with a predetermined magnitude. Without the rest portion, the inertia ball would tend to roll in response even to a slight oscillation, which would instabilize the operating characteristics of the element near its responsive threshold and would cause chattering between the contacts. The size of the recess 2A depends upon the diameter of the inertia ball 8 and a predetermined oscillational acceleration to which the element responds. The oscillational acceleration α (threshold value) which causes the inertia ball 8 to start rolling is obtained from the following equation (1):

$$\alpha = \frac{r \cdot g}{\sqrt{R^2 - r^2}} \quad (1)$$

where R is a radius of the inertia ball 8 and r is a radius of the recess 2A.

For example, consider now the case where the seismosensitive element is designed to be responsive to the earthquake of a fifth degree on the seismic scale. In this case, the oscillational acceleration causing the inertia ball 8 to start rolling is obtained as approximately 100 gal from the above equation (1) when the radius R of the inertia ball 8 is 3 mm and the radius r of the recess 2A serving as the rest portion is 0.3 mm. The oscillational acceleration is approximately 250 gal when the inertia ball radius R is 3 mm and the recess radius r is 0.75 mm. A range defined by these values of the oscillational acceleration corresponds approximately to a range of oscillational acceleration between 80 and 250 gal at the fifth degree on the seismic scale. Accordingly, the oscillational acceleration causing the inertia ball 8 to start rolling can be set in the range corresponding to the fifth degree on the seismic scale when the radius of the rest portion takes a value 0.1 to 0.25 times smaller than the radius of the inertia ball 8.

The operation of the seismosensitive element 1 will be described. The inertia ball 8 rests on the recess 2A when it is stationary at its normal attitude. In this state, the inertia ball 8 is positioned apart from the contact plate 7 and accordingly, the terminal pin 6 is not electrically connected to the housing 2 or the metal header 3. When subjected to an oscillation, the inertia ball 8 is kept resting on the recess 2A until the predetermined oscillational acceleration intensity value depending upon the radii of the inertia ball and the recess is reached. When the predetermined oscillational acceleration intensity value is reached, the inertia ball 8 is caused to move out of the recess 2A, rolling on the bottom face 2B of the housing 2. Rolling on the bottom face 2B, the inertia ball 8 comes into contact with the feather portions 7A of the contact plate 7. Consequently, an electrical path is made by the terminal pin 6, the contact plate 7, the inertia ball 8, the housing 2 and the header 3. A resultant electrical signal is supplied to various warning devices or control devices so that a protective device such as the automatic shutoff valve or the control device of the gas burning appliance is operated to thereby prevent occurrence of fire due to the earthquake.

The oscillations due to the earthquake need to be distinguished from the other oscillations or disturbing oscillations for prevention of unnecessary operation of the protective device when the above-described seismosensitive element is incorporated in the automatic shutoff valve employed in the city gas equipment or the commercial propane gas equipment. The oscillations due to the earthquake have waveforms in a vast range of cycle. Sinusoidal wave oscillations ranging between 0.3 and 0.7 seconds of cycle are usually employed as an alternative characteristic. When a range of the responsive threshold of the seismosensitive element is between 130 and 190 gal, which range corresponds to that of the earthquake of the fifth degree on seismic scale, the sinusoidal oscillations of the cycle ranging between 0.3 and 0.7 seconds are applied to the seismosensitive element, which sinusoidal oscillations take a responsive range value in a range of acceleration corresponding to the range of the threshold. For example, consider a case where a microcomputer is arranged to determine that an earthquake has occurred, under the condition that "on" and "off" signals each having a period of 40 milliseconds or above are delivered three cycles or above within three seconds. The signal generated by the seismosensitive element needs to be in accord with the above-mentioned condition in order that the microcomputer determines an occurrence of the earthquake when the above-described sinusoidal oscillation is applied to the seismosensitive element and the protective device such as the automatic shutoff valve is operated.

The elasticity of the contact plate 7 and the angle 7B of the feather portion 7A are important factors for determination of the "on" and "off" periods of the signal in the seismosensitive element of the embodiment. For example, consider the case where the contact plate 7 is formed from a phosphor bronze plate to have a thickness of 0.05 mm, a length of 4 mm and each feather portion's width of 0.5 mm and the inertia ball 8 is formed from a steel ball of approximately 0.7 gram with the nickel plating applied thereto. In this case, when the angle 7B of each feather portion 7A with respect to the bottom face 2B is 90 degrees and the feather portions 7A are disposed around the ball 8 concentrically therewith, the inertia ball 8 is caused to bound immediately upon contact with the feather portion 7A and hops up and down against the housing bottom face 2B. Consequently, a sufficient duration of contact of the inertia ball 8 with the feather portions 7A cannot be obtained. Thus, a necessary "on" period cannot be obtained even when the sinusoidal oscillations taking the above-mentioned responsive range value are applied to the seismosensitive element in the predetermined cycle. Furthermore, since the "on" period is short, it is difficult to discriminate the operating characteristics of the element from that in the case where the sinusoidal oscillations are applied in a cycle shorter than the predetermined one. Additionally, the oscillations cannot be distinguished from electrical noise. The above-described phenomena becomes more conspicuous as the contact plate 7 has a large spring constant. It can be understood that when the inertia ball 8 rolls in response to the oscillations into contact with the feather portions 7A, as shown by dotted line in FIG. 2, a function for maintaining the contact state needs to be provided by the angle 7B of the feather portion 7A with respect to the housing bottom face 2B.

When brought into contact with the feather portions 7A with some pressure, the angle 7B causes the inertia ball 8 to receive a composite force pushing it against the housing bottom face 2B. Sliding on the feather portions 7A, the inertia ball 8 is braked by the composite force in the condition that it is held between the feather portions 7A. Consequently, when the angle 7B is less than 90 degrees, the "on" period can be rendered longer as compared with that when the angle 7B is 90 degrees. Furthermore, since the inertia ball 8 is held between the feather portions 7A and the bottom face 2B of the housing 2 with a predetermined force, the state of the inertia ball 8 in contact with the feather portions 7A and the bottom face 2A can be rendered stable. Additionally, since the inertia ball 8 is brought into contact with the feather portions 7A and the housing bottom face 2B, sliding thereon, the contact surface of the inertia ball 8 can be kept clean, which prevents occurrence of failure in contact.

Accordingly, the angle 7B between the inertia ball 8 and the housing bottom face 2B is set at a value less than 90 degrees when the inertia ball 8 is brought into contact with the feather portions 7A. That is, the inertia ball 8 is interposed between the feather portions 7A of the contact plate 7 and the housing bottom face 2B, as a wedge is inserted. Consequently, the inertia ball 8 is pushed by the feather portions 7A against the housing bottom face 2B, which stabilizes the inertia ball 8 in the contact state. Furthermore, the electrical contact resistance can be stabilized since the inertia ball 8 is brought into contact with the feather portions 7A and the housing bottom face 2B, sliding thereon such that a braking effect is obtained.

In the present invention, an amount of deflection of each feather portion 7A of the contact plate 7 is set to be ranged between 0.25 and 5 mm, when a force corresponding to the weight of the inertia ball 8 is applied to one feather portion 7A at the contact point therebetween. This setting of the amount of deflection of the feather portion 7A can obtain a suitable value for a composite force exerted upon the inertia ball 8 by the contact plate 7 to cause it to be pushed against the housing bottom face 2B when the inertia ball 8 is in contact with the contact plate 7. This setting can also obtain a suitable value for a composite force returning the inertia ball 8 towards the center of the housing 2. Furthermore, this setting can obtain a suitable value for the duration for contact between the inertia ball 8 and the feather portions 7A.

The following facts were confirmed in an experiment in which a steel inertia ball having a diameter of 5.5 mm and a weight of 0.7 gram was used as the inertia ball 8. That is, the amount of deflection of the contact plate in the case of collision of the inertia ball thereagainst is slight when each feather portion has a width of 0.5 mm and a thickness of 0.06 mm or above. The "on" period is rendered shorter than the "off" period since the inertia ball rebounds from the feather portions. In addition, the inertia ball cannot precisely follow the oscillations set therein since its movement is disturbed when it rebounds from the feather portions. Furthermore, even when the angle 7B of the feather portion 7A with respect to the housing bottom face 2B is set at 90 degrees or below, it is difficult to cause the braking effect resulting from a force holding the inertia ball between the feather portions and the housing bottom face and the sliding movement of the inertia ball, since the amount of deflection of each feather portion is small. In this case, the "on" period of the signal is not so much increased as compared with that in the case where the angle 7B is 90 degrees.

In the case where the diameter of the inertia ball is above 5.5 mm, the waveforms of the "on" and "off" signals can be suitable for the condition of determination by the microcomputer even when the thickness of each feather portion takes a value of 0.06 mm or above. However, the inner diameter of the housing is limited when a small-sized seismosensitive device is produced. Under the circumstances, when the diameter of the inertia ball is increased, the distance of movement of the inertia ball is reduced, which cannot provide a sufficient "off" period. Thus, increasing the inertia ball diameter as described above is not adequate.

Figure 3:
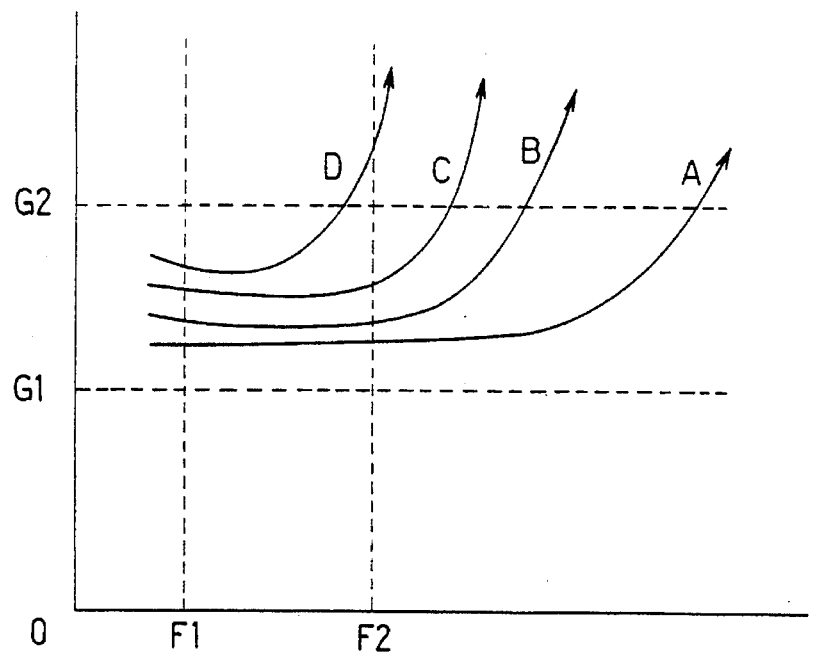
FIG. 3 is a graph showing operating characteristics of the seismosensitive element.

FIG. 3 shows the relationship between the inclination 2C of the housing bottom face 2B and accelerations by frequencies, based on which the microcomputer determines that an earthquake has occurred. The microcomputer is designed to determine that the earthquake has occurred, under the condition that "on" and "off" signals each having a period of 40 milliseconds or above are delivered three cycles or above within three seconds, as described above. In FIG. 3, oscillational frequencies F1 and F2 are 1.43 and 3.3 Hz respectively and oscillational accelerations G1 and G2 are 130 and 190 gal respectively. Curves A to D show the characteristics in the case of different inclinations 2C of the housing bottom face 2B. Curve A shows the case where the inclination 2C of the housing bottom face 2B is less than 2 degrees, curve B shows the case where the inclination 2C is 3 degrees, curve C shows the case where the inclination is 6 degrees, and curve D shows the case where the inclination is 11 degrees. It can be understood from FIG. 3 that the seismosensitive element operates even in a high frequency range when the inclination 2C is small, which shows that the element operates in response to so-called noise due to disturbing oscillations. Furthermore, when the inclination 2C is large, malfunction of the element in the high frequency range can be prevented while the responsiveness of the element is lowered in the low frequency range. Thus, the response characteristics of the seismosensitive element is lowered when the inclination 2C is large, and additionally, the oscillational acceleration to which the seismosensitive element responds in the low frequency range is increased.

In view of the foregoing, the inclination 2C of the housing bottom face 2B is set in the range between 4 and 10 degrees and the inner diameter of the housing 2 is so set that an addition of it and the diameter of the inertia ball 8 is within 4 mm, in the embodiment. Consequently, the inertia ball 8 can be prevented from hopping vertically against the horizontal oscillation and an amount of resistance thereof in the rolling can be reduced even when a smaller inertia ball is used so that the size of the seismosensitive element is reduced. Thus, stable contact between the inertia ball and the contact plate and the housing bottom face can be achieved.

Furthermore, in the case where the inclination 2C of the housing bottom face 2B is 3 degrees or less, the rolling friction can prevent the inertia ball 8 from returning to the center in the housing, if the seismosensitive element 1 is inclined one or two degrees relative to the normal attitude when installed. Accordingly, a high installation accuracy is required when the seismosensitive element is installed. Furthermore, a composite force acts on the inertia ball 8 to push it against the housing bottom face 2B while the inertia ball 8 is rolling in response to the oscillational acceleration. The contact between the inertia ball 8 and the housing bottom face 2B is unstable since this composite force is insufficient. Consequently, the chattering can occur when the inertia ball 8 is brought into contact with the feather portions 7A. Furthermore, when the inclination 2C exceeds 10 degrees, a sufficient composite force pushing the inertia ball 8 against the housing bottom face 2B can be obtained, which stabilizes the contact between the inertia ball 8 and the housing bottom face 2B. In this case, however, the amount of resistance the inertia ball 8 suffers while rolling is increased, which reduces the distance by which the inertia ball 8 rolls and the distance by which the inertia ball 8 moves, sliding on the feather portions 7A. The duration of contact between the inertia ball 8 and the feather portions 7A also becomes insufficient. Consequently, a ratio of the "on" period to the "off" period becomes large, which makes it difficult to cause the output signal to correspond to the determination criterion programmed in the microcomputer.

The inner diameter of the housing 2 is determined as follows. The major frequency of the earthquake ranges between 1 and 5 Hz. The sinusoidal oscillation having the frequency in the above-described range as the alternative characteristics is applied to the seismosensitive element in a characteristics test. A stable output signal can be obtained when the inertia ball rolls on the housing bottom face by the maximum distance of 2 mm from the center thereof. Provision of more distance will result in redundance and increases the size of the seismosensitive element.

For example, the amplitude of 6 mm is applied to the seismosensitive element when the oscillations having the frequency of 2 Hz are applied to the seismosensitive element and the acceleration is 100 gal which is approximately its lower limit value in the case of the earthquake of the fifth degree of the seismic scale 5. When the inertia ball is set to start rolling at 100 gal and its distance of movement is set to a value of 2 mm or below from the center thereof, the inertia ball is reliably brought into contact with the contact plate since it rolls to its maximum movement position.

Furthermore, the amplitude is about 2.5 mm when the oscillational frequency is 5 Hz and the acceleration is 250 gal which is approximately its upper limit value in the case of the earthquake of the fifth degree on the seismic scale. In this case, too, the inertia ball is brought into contact with the contact plate. Actually, however, the necessary distance of movement of the inertia ball 8 is 2 mm in its response to the normal oscillation since the magnitude of movement of the inertia ball is reduced by its contact with the contact plate and its sliding movement. More distance for the movement of the inertia ball is not necessary. On the contrary, when the distance of movement of the inertia ball is set at a value larger than necessary, the seismosensitive element is subjected to a relatively large impact acceleration during transportation such that the inertia ball is caused to move to collide with the inside of the housing. In this case, the angle 7B between the contact plate and the inertia ball is reduced and a resistance force due to friction induced by the inertia ball pushed against the housing bottom becomes larger than a restoring force resulting from the weight of the inertia ball and a repulsive force of the contact plate. Consequently, there is a high possibility that the inertia ball is held between the housing bottom and the contact plate, so that the inertia ball cannot be returned to its normal position even when the seismosensitive element is returned to its normal position.

As obvious from the foregoing, the maximum distance of movement of the inertia ball 8 can be defined by determining the inner diameter of the housing 2. Accordingly, the distance of movement of the inertia ball 8 in the case where the seismosensitive element is subjected to the abnormal impact acceleration can be rendered approximately the same as that due to normal oscillations. Consequently, the angle 7B can be prevented from being unnecessarily reduced, which enhances the return of the inertia ball 8 under the action of its weight and the repulsive force of the contact plate 7.

The amplitude is about 1 mm when the oscillational frequency is 5 Hz and the acceleration is 100 gal. In this case, the "on" and "off" signals are reliably generated when the distance between the inertia ball 8 and the feather portions 7A is set at a value not larger than the amplitude. For example, when the upper limit frequency is 5 Hz, each of the "on" and "off" signals is theoretically generated ten times for one minute. The signal cycle is 50 milliseconds if the "on" period is as long as the "off" period. However, since the operating period of time of the seismosensitive element varies actually, there is a possibility that the frequency of 5 Hz or below cannot be detected when the microcomputer is so programmed that the determination threshold value is 50 milliseconds. Accordingly, each of the "on" and "off" time periods is set to 40 milliseconds or above in the invention so that the variations in the operating time period are allowed. In this case, the microcomputer is arranged not to determine that an earthquake has occurred, when the oscillational frequency is 6.25 Hz or more.

Based on the above-described factors, the microcomputer is programmed and the distance between the inertia ball and the contact plate, the spring constant of the feather portion of the contact plate, the inclination of the housing bottom face and the like are determined.

The following problem can be encountered when the vertical distance between the contact plate 7 and the inertia ball 8 is short. That is, under the condition that a portion of the feather portion 7A with which the inertia ball 8 comes in contact is not changed, the length of the feather portion 7A is rendered shorter in the case where the above-mentioned vertical distance is shorter than in the case where it is long. When the length of the feather portion 7A is reduced, its spring constant is increased and an angular change of the feather portion 7A relative to the amount of movement of the inertia ball 8 is increased. Accordingly, the mass of the inertia ball 8 needs to be increased or the spring constant of the feather portion 7A of the contact plate needs to be reduced. Furthermore, the contact angle of the inertia ball 8 with respect to the feather potion 7A is unnecessarily decreased when the inertia ball 8 moves to be adjacent to the inner face of the housing 2, since the angular change of the feather portion 7A is large. Accordingly, there is a possibility that the resistive force due to the friction may become larger than the returning force of the inertia ball 8 due to the repulsive force of the feather portion 7A.

In view of the foregoing, the vertical distance between the inertia ball 8 and the contact plate 7 is determined to be five percent of the diameter of the inertia ball 8 or above. This determination provides the contact plate of a desired performance without use of the contact plate formed of an unnecessarily thin material or formed into an unnecessarily slender construction or without use of the inertia ball of a large mass. For example, when the used inertia ball 8 has the diameter of 5 mm and the vertical distance between the inertia ball 8 and the contact plate 7 is 0.5 mm, the "on" and "off" time periods are stable under the condition that the portion of the feather portion 7A with which the inertia ball 8 comes in contact is not changed. However, both of the "on" and "off" time periods become uneven when the vertical distance is 0.2 mm. The reason for this is that the spring constant of the feather portion of the contact plate is increased, as described above. Furthermore, in the present invention, the allowable error at the time of assembly need not be rendered smaller than necessary, which simplifies the assembly.

The sinusoidal waves are employed as the alternative characteristics in the characteristics test of the seismosensitive element as described above, since it is difficult to reproduce the oscillation of an actual earthquake. Accordingly, the acceleration varies largely in the actual earthquake although it varies relatively smoothly in the characteristics test. Accordingly, there is a possibility that when the seismosensitive element is subjected to a particularly large oscillation or impact acceleration, the inertia ball 8 may enter deep between the feather portions 7A and the housing bottom face 2B to be held therebetween if the frictional force acting between the inertia ball 8 and the feather portions 7A is large. In this case, the self-weight and the repulsive force of the feather portions 7A cannot return the inertia ball 8 to its former position when it becomes stationary with the disappearance of the oscillations and accordingly, the electrical path cannot be opened.

To overcome the above-described drawback, the seismosensitive element of the invention is constructed so that a resultant force (F4+F5) is larger than a resultant force (F2+F3) in the movable range of the inertia ball where F2 is a composite force of a frictional force F1 between the inertia ball 8 and the feather portion 7A, the composite force F2 acting in a direction parallel to the housing bottom, F3 is a frictional force between the inertia ball and the housing bottom, F4 is a composite force of a repulsive force applied to the inertia ball by the feather portion, the composite force F4 acting in a direction parallel to the housing bottom, and F5 is a composite force due to the weight of the inertia ball, the composite force F5 acting in a direction parallel to the housing bottom.

Figure 2:
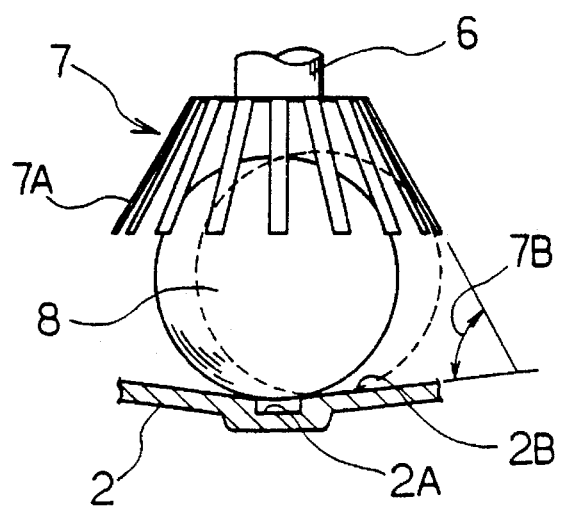
FIG. 2 is a partially enlarged sectional view of the seismosensitive element.
Figure 4:
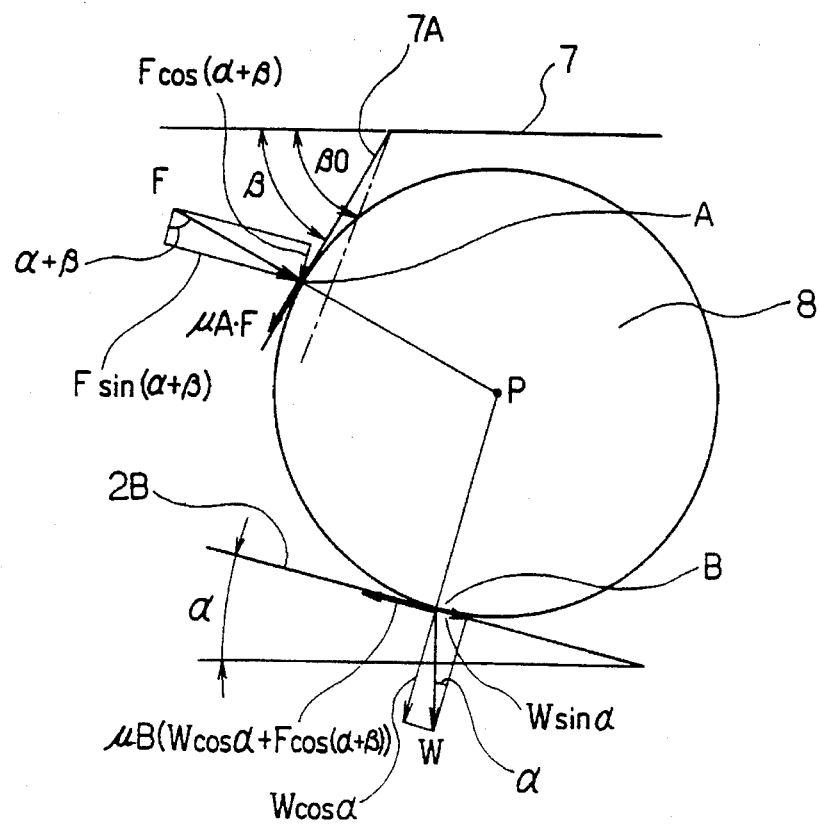
FIG. 4 is a schematic diagram for explaining the operation of the seismosensitive element.

In the above-described construction, the inertia ball 8 can be prevented from being held between the feather portion 7A and the housing bottom and can be allowed to return to the former position, no matter what position the inertia ball may assume within its movable range. Consequently, the electrical path can be opened reliably. This will be further described with reference to FIG. 4. FIG. 4 shows a vector representation of the forces acting on the inertia ball 8 of the seismosensitive element employed in the seismosensitive device. In FIG. 4, reference symbol F designates the repulsive force applied to the inertia ball by the feather portion, W the weight of the inertia ball, P the center of the inertia ball, $\alpha$ the inclination between the housing bottom face and a tangent touching the inertia ball, $\beta$ the inclination between the feather portion and a horizontal plane where $\beta \geq 0$, $\mu A$ a friction factor at a contact point between the inertia ball and the feather portion, and $\mu B$ a friction factor at a contact point between the inertia ball and the housing bottom face. The abovementioned inclination $\alpha$ is an inclination of the tangent at the point of contact between the inertia ball and the housing bottom face. The inclination $\alpha$ agrees with the inclination 7B when the housing bottom face is conical as shown in FIG. 2. However, it does not necessarily agree with the inclination 7B when the housing bottom face has the other configurations. In order that the inertia ball 8 returns to the former position on the recess 2A when the seismosensitive element has rested in the normal attitude, the following expression needs to be satisfied:

$$F \cdot \sin(\alpha+\beta) + W \cdot \sin \alpha > \mu A \cdot F \cdot \cos(\alpha+\beta) + \mu B \cdot (W \cdot \cos \alpha + F \cdot \cos(\alpha+\beta)) \qquad (2)$$

where $\alpha+\beta \leq 90°$.

Describing the expression (2), the left side of the expression shows the returning force causing the inertia ball 8 to move to the right along the housing bottom face 2B, as viewed in FIG. 4. Its right side shows the frictional force causing the inertia ball 8 to remain in position. The inertia ball 8 starts to move when the force shown by the left side of the expression is above that of the right side while it remains in position when the force shown by the right side of the expression is above that of the left side.

The left side of the expression (2) includes a term representative of the returning force due to the repulsive force F and a term representative of the returning force due to the weight W of the inertia ball 8. More specifically, the term, $F \cdot \sin(\alpha+\beta)$, represents a composite force of the repulsive force F acting in the direction parallel to the housing bottom face 2B or the returning force. The term, $W \cdot \sin \alpha$, represents a composite force of the weight of the inertia ball 8 acting in the direction parallel to the housing bottom face 2B or the returning force.

The right side of the expression (2) includes a term representative of a composite force of the frictional force resulting from the repulsive force of the feather portion 7A and the friction at the point of contact between the feather portion 7A and the inertia ball 8, which point of contact will be referred to as "contact point A." The right side of the expression further includes a term representative of the frictional force resulting from the force pushing the inertia ball 8 against the housing bottom face 2B and the friction at a point of contact between the inertia ball 8 and the housing bottom face 2B, which point of contact will be referred to as "contact point B." The term, $\mu A \cdot F$, represents the frictional force acting at the contact point A. The term, $\mu A \cdot F \cdot \cos(\alpha+\beta)$, represents the composite force acting in the direction parallel to the housing bottom face 2B. The inertia ball 8 is pushed against the housing bottom face 2B by a resultant force of the composite force of the weight of the inertia ball 8 acting vertically on the housing bottom face 2B and represented by the term, $W \cdot \cos \alpha$, and the composite force of the repulsive force F acting vertically on the housing bottom face 2B and represented by the term, $F \cdot \cos(\alpha+\beta)$. This resultant force causes the frictional force represented by the term, $\mu B(W \cdot \cos \alpha + F \cdot \cos(\alpha+\beta))$.

Either the frictional force $\mu A_0 \cdot F$ due to the sliding friction at the contact point A or the frictional force $\mu B_0(W \cdot \cos \alpha + F \cdot \cos(\alpha+\beta))$ lower than the other causes the inertia ball 8 to slide, and the other frictional force does not cause the inertia ball to slide. Consequently, the inertia ball is caused to roll. For example, consider the case where the weight of the inertia ball 8 is 0.69 gram when $\alpha=6°$ the angle $\beta_0$ between the feather portion in the free state without any elastic deformation by the inertia ball and the inertia ball at the contact point is 55°, the angle $\beta$ between the feather portion and the housing bottom face at the position where the inertia ball engages the housing bottom face is 40°, and the repulsive force F is 0.6 gram. Under these conditions, the frictional force at the contact point B overcomes the frictional force at the contact point A and accordingly, the inertia ball slides on the feather portion and rolls along the housing bottom face. Consequently, it can be understood that the friction factor $\mu A$ at the contact point of the feather portion and the inertia ball, which factor is represented in the right side of expression (2) is a static frictional resistance factor under the above-mentioned conditions and that the friction factor $\mu B$ at the contact point B of the inertia ball and housing bottom face is a rolling friction factor under the above-mentioned conditions.

Generally, the friction factor depends upon the material and the surface condition. Consider now the case where the sliding friction factor between the inertia ball and the feather portion or between the inertia ball and the housing bottom face is 1.0 and the rolling friction factor between the inertia ball and the feather portion or between the inertia ball and the housing bottom face is 0.001. When these values are applied to the expression (2), it holds even where the inertia ball is positioned at a position where it engages the housing bottom face in the seismosensitive element under the above-described conditions. Thus, it can be understood that the weight of the inertia ball and the repulsive force of the feather portion causes the inertia ball to roll.

There is a possibility that roughness of the surfaces of the inertia ball, feather portions and housing bottom face and minute cracks on these surfaces may increase the above-mentioned values. In such a case, the inertia ball would be restricted between the housing bottom face and the feather portions after it has rolled, and consequently, the inertia ball could not return to the former position. However, actually, the spring rate of the feather portion and the like are so set that the inertia ball is prevented from engaging the inner wall of the housing in the above-described seismosensitive element when it is subjected to the normal oscillational acceleration. Even when the element is subjected to an impulse acceleration larger than the normal oscillational acceleration, for example, reaction caused at the position where the inertia ball engages the housing inner wall is to be considered.

However, the inertia ball easily moves to engage the housing inner wall when the free angle $\beta_0$ of the feather portion is small. Consequently, the inertia ball would be restricted by the frictional force when the friction factor is large. Furthermore, the distal end of the feather portion touches the inertia ball or the housing inner wall when the free angle $\beta_0$ is excessively large, and consequently, the electrical path would not be opened.

In view of the foregoing, the free angle $\beta_0$ is determined to range between 45° and 75° and $\alpha+\beta \geq 40°$ where $\alpha$ is the inclination of the tangent at the point of contact between the inertia ball and the housing bottom face when the inertia ball engages the housing bottom face and the housing inner wall simultaneously and $\beta$ is an inclination of the feather portion with respect to the horizontal plane where $\alpha \geq 0$ and $\beta \geq 0$. The inertia ball can be prevented from being restricted between the feather portions and the housing bottom face when the angles of the feather portion 7A in its free state and in its state of the maximum elastic deformation are set as described above.

In order that $\alpha+\beta \geq 40°$ when $\beta_0$ is set at 40° or below, the repulsive force for the return of the inertia ball cannot be obtained since the elastic deformation of the contact plate by the inertia ball cannot be obtained. Consequently, the spring rate of the contact plate needs to be increased in this case. Furthermore, the variations in the duration of contact of the inertia ball is increased since the distance that the inertia ball moves sliding on the contact plate is reduced. Furthermore, the degree of freedom in selection of the length of the feather portion is reduced in order that the distal end of the feather portion is prevented from touching the inertia ball or the housing inner side wall when $\beta_0$ is set at 75° or above. That is, the distal end of the feather portion engages the inner side wall of the housing before the inertia ball engages it, when the length of the feather portion is set at a so large value that the contact point of the contact plate with the inertia ball is not positioned on the distal end of the feather portion. On the other hand, the distal end of the feather portion engages the inertia ball when the feather portion is rendered short so that the distal end of the feather portion is prevented from touching the housing inner side wall. Accordingly, the dimensional tolerance and the erection tolerance of the feather portion as a part are narrowed, which requires high accuracy in the production of the part.

Additionally, when the value of $\alpha+\beta$ is 40° or less, the force pushing the inertia ball against the housing bottom face, which force is a composite force of the repulsive force of the feather portion against the inertia ball, is increased when the inertia ball engages the housing inner side wall. The frictional force acting on the inertia ball overcomes the return force of the inertia ball and accordingly, the inertia ball is restricted between the contact plate and the housing bottom face.

In view of the foregoing, when the inclination $\beta_0$ of the feather portion with respect to the horizontal plane is set at a value below 75°, as described above, the distance that the inertia ball moves sliding on the contact plate can be prevented from being shortened and a sufficient setting of the dimensions of the feather portion can be ensured, which renders the assembly easy. Furthermore, the inertia ball can return to the central portion of the housing by the action of its self-weight and the feather portion of the contact plate even when the inertia ball occupies the position where it engages the housing inner side wall.

FIGS. 5 and 6 illustrate the above-described seismosensitive element enclosed in a resin casing 12 holding the element in its normal attitude. An electrically conductive L-shaped pin 13 is welded on the header 4 of the seismosensitive element 1. The seismosensitive element 1 is inserted into the casing 12 through its underside opening.

The terminal pin 6 and the pin 13 are inserted through apertures 12A and 12B formed in the casing 12, respectively. The header 4 is engaged with a projected attitude maintaining portion 12C formed in the inside of the casing 12 so that the seismosensitive element 1 is positioned. In this condition, terminals 14 and 15 are welded to the ends of the terminal pin 6 and the pin 13 projecting from an upper wall of the casing 12, respectively, such that the seismosensitive element 1 is fixed to the casing 12.

In order that the seismosensitive device 11 may be mounted on a kerosene fan space warmer, for example, the bottom face 12D of the casing 12 is closely attached to a bottom plate of the space warmer or the like and then, screws are inserted into respective fixing apertures 12E to be driven home so that the seismosensitive device is fixed.

FIG. 7 illustrates a second embodiment of the invention. In the second embodiment, a protector 9 having a high stiffness is provided in the vicinity of the portion of the contact plate 7 secured to the terminal pin 6 so that a permanent deformation of the contact plate 7 due to the collision of the inertia ball 8 therewith can be prevented. The protector 9 is formed of a steel plate having a thickness several times larger than that of the contact plate 7 or more. An angle 9B of a circumferential edge portion 9A of the protector 9 is set to a value as large as or smaller than the angle 7B of the contact plate 7. The protector 9 is bent outwards as it goes to its end so that its end can be prevented from striking the inertia ball 8. The dotted line in FIG. 7 shows the position of the inertia ball 8 when the seismosensitive element is subjected to the oscillational acceleration. As obvious from this position of the inertia ball 8, the protector 9 is mounted not to obstruct the normal movement of the inertia ball 8 and the normal elastic deformation of the feather portion 7A of the contact plate 7 when the seismosensitive element is subjected to the normal oscillational acceleration under the condition of its normal use.

The contact plate 7 would be held between the inertia ball 8 and the protector 9 when the seismosensitive element is subjected to a large acceleration such as the impact acceleration. However, the shape of the protector 9 is determined so that the deformation of the contact plate 7 does not exceed its range of elastic deformation when the contact plate 7 is held between the protector 9 and the inertia ball 8. Furthermore, the protector 9 is so formed as not to have any corners holding the contact plate 7 with the inertia ball 8. Thus, the permanent deformation of the contact plate is prevented.

FIG. 8 illustrates a third embodiment of the invention. In the third embodiment, a protector 10 is provided between the contact plate 7 and the inertia ball 8 so that the contact plate 7 can avoid being held between the inertia ball 8 and the protector 10. The protector 10 is not brought into contact with the inertia ball 8 during its rolling on the housing bottom face 2B under the condition that the seismosensitive element 1 is subjected to the normal acceleration in its normal use, as shown by dotted line in FIG. 8.

The inertia ball 8 collides with the protector 10 when the seismosensitive element is subjected to the impact acceleration or the like such that the inertia ball 8 moves upwards, as viewed in FIG. 8. In this case, the direct collision of the contact plate 7 with the inertia ball 8 can be avoided as in the second embodiment, whereby the permanent deformation of the contact plate 7 can be prevented.

FIG. 9 illustrates a fourth embodiment. In the seismosensitive element 16, the housing 2 enclosing the electrically conductive inertia ball 8 is closed by the header 3 in the same manner as in the first embodiment such that the closed housing is provided. The angle between the housing bottom face 2B and the feather portion 17A of the contact plate 17 serving as the contact portion with the inertia ball 8 is approximately 90 degrees. The length of the feather portion 17A is determined so that its distal end is located lower than the plane passing the center of the inertia ball 8.

The amount of deflection of the feather portion 17A is set so as to be ranged between 0.25 and 5 mm when the force corresponding to the weight of the inertia ball 8 is applied to one feather portion 17A at the contact point of the feather portion and the inertia ball, as described above. This setting of the amount of deflection of the feather portion 17A can allow the feather portion 17A to deflect and provide a stable signal. When the amount of deflection of the feather portion 17A is below 0.25 mm, the time period of contact of the feather portion 17A and the inertia ball 8 becomes too short and the signal becomes unstable. When the amount of deflection exceeds 5 mm, the contact time period becomes too long, which makes it difficult to distinguish the frequency-dependent change in the rate of "on" and "off" periods.

In the embodiment, however, the feather portion 17A deflects when the inertia ball 8 collides therewith, as is shown by dotted line in FIG. 9. The inertia ball 8 is deaccelerated by the deflection of the feather portion 17A. Furthermore, since the feather portion 17A is inclined outwards upon collision of the inertia ball 8 therewith, the composite force pushing the inertia ball 8 against the housing bottom face 2B is applied to the inertia ball in the same manner as in the case where the feather portion is originally formed so as to be inclined outwards, as shown in FIG. 1 and accordingly, the inertia ball 8 is deaccelerated by its sliding movement.

Figure 10:
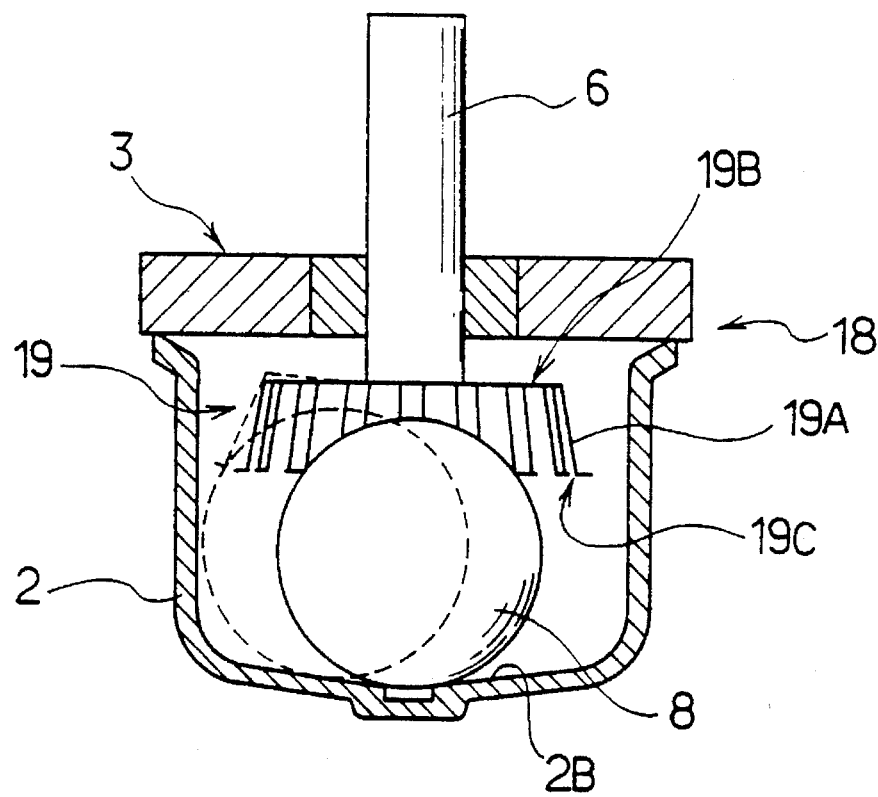
FIG. 10 is a longitudinally sectional view of the seismosensitive element of a fifth embodiment.
Figure 11:
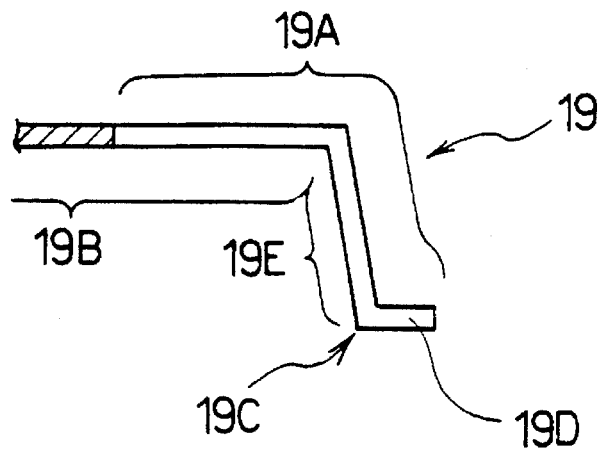
FIG. 11 is a partially enlarged view of a contact plate employed in the seismosensitive element of the fifth embodiment.

FIGS. 10 and 11 illustrate a fifth embodiment. In the seismosensitive element 18, too, the housing 2 enclosing the electrically conductive inertia ball 8 is closed by the header 3 in the same manner as in the foregoing embodiments such that the closed housing is provided. A contact plate 19 secured to the distal end of the terminal pin 6 includes the feather portions 19A starting with a horizontal portion 19B. A downwardly bent portion 19E has a distal end 19C adapted to be located higher than the center of the inertia ball 8. It is preferable that the angle between the feather portion 19A and the housing bottom face 2B be 90 degrees or below. A bent portion 19D of the feather portion 19A is provided for avoiding intrusion of the feather portion 19A into the inertia ball 8 at the time of engagement.

In the fourth embodiment shown in FIG. 9, a force acting so that the inertia ball 8 is taken up by the feather portions 17A is produced when the spring rate of the feather portion 17A is high and the angle between the feather portion 17A and the housing bottom face 2B is 90 degrees or more. Consequently, the contact of the inertia ball 8 with the housing bottom face 2B becomes unstable.

In the fifth embodiment, however, the distal end 19C of the feather portion 19A is located higher than the center of the inertia ball 8. As compared with the construction in which the distal end of the feather portion is not located higher than the center of the inertia ball, the distance of movement of the inertia ball moving until it engages the feather portion 19A is increased, as obvious from the position of the inertia ball shown by dotted line in FIG. 10. Consequently, the diameter of the contact plate can be reduced relative to the inertia ball 8 and accordingly, the seismosensitive element can be rendered small-sized. Furthermore, since the feather portion engages the inertia ball at its portion above its center and the feather portion 19A starts with its horizontal portion 19B, the contact plate 19 deflects upwards upon its engagement with the inertia ball regardless of the angle between the feather portion and the housing bottom face. Consequently, the force pushing the inertia ball 8 against the housing bottom face 2B is produced and stabilizes the contact between the inertia ball 8 and the housing bottom face 2B. Furthermore, since the inertia ball 8 engages the feather portion 19A at the portion thereof above its center, the force acting so that the inertia ball 8 is taken up by the feather portions 19A is not produced even when the angle of the feather portion 19A with respect to the housing bottom face 2B is 90 degrees or more. Consequently, the contact between the inertia ball 8 and the housing bottom face 2B can be stabilized even when the bending angle of the feather portion 19A is 90 degrees or more.

Figure 12:
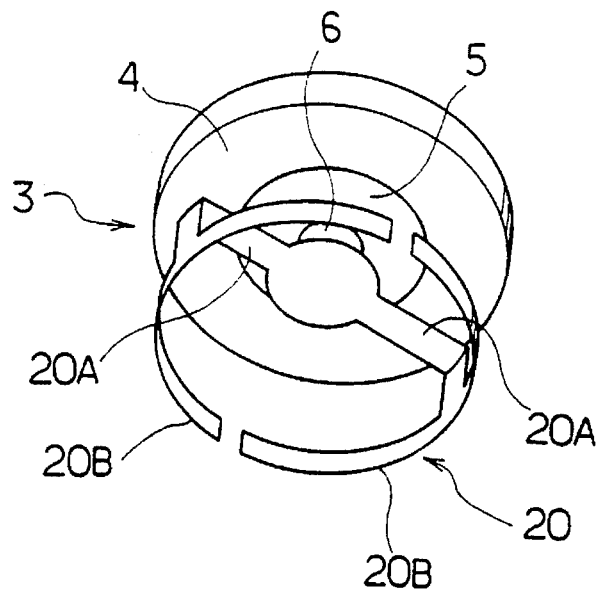
FIG. 12 is a partial perspective view of the seismosensitive element of a sixth embodiment.

FIG. 12 illustrates a sixth embodiment. The contact plate 20 of the seismosensitive element is formed of a thin metal plate. The contact plate 20 has two feather portions 20A extending from its portion secured to the terminal pin 6. Each feather portion 20A has an arc-shaped contact portion 20B at its extended end. The contact portions 20B are arranged to circularly surround the inertia ball 8. Accordingly, the inertia ball 8 is brought into contact with the circular contact portions 20B when the seismosensitive element is subjected to the acceleration.

Figure 13:
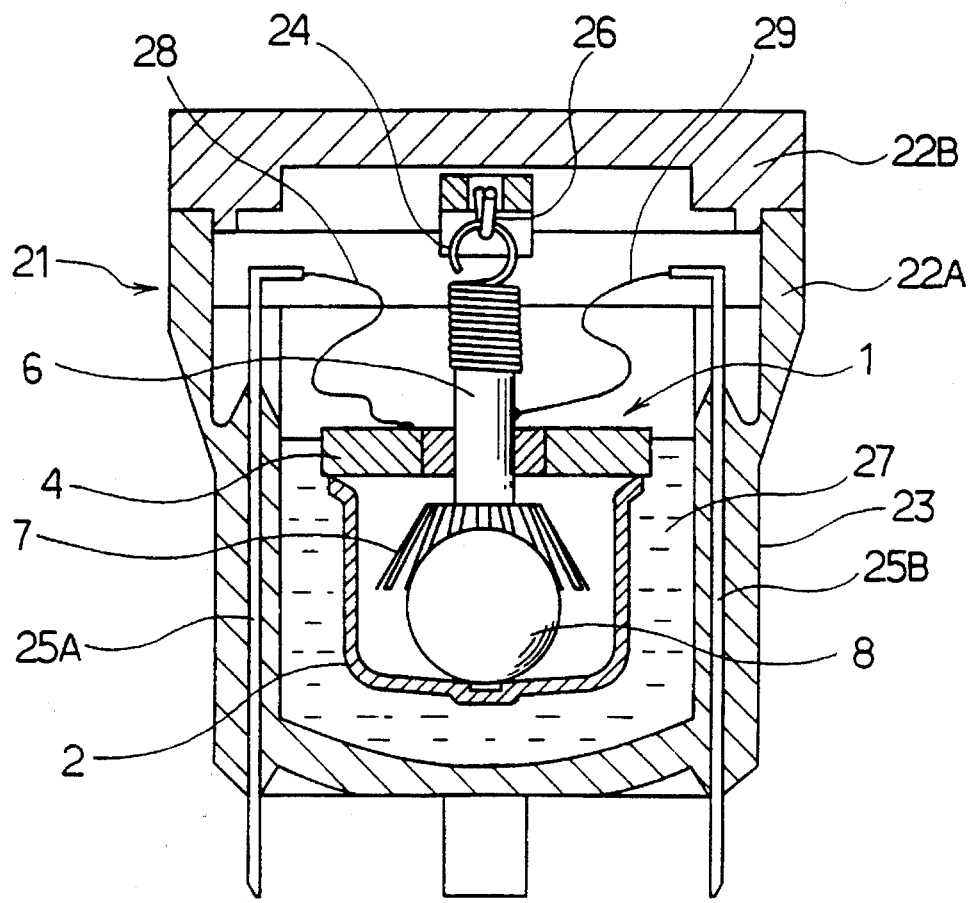
FIG. 13 is a longitudinally sectional view of the seismosensitive device of a seventh embodiment.

FIG. 13 illustrates a seventh embodiment. The seismosensitive device 21 comprises a casing 23 including a receptacle 22A formed of a resin and a header 22B secured to the receptacle 22A by way of ultrasonic welding and the seismosensitive element 1 enclosed in the casing 23. A hook 24 serving as a hanging portion is secured to the terminal pin 6. The casing 23 serves to hold the seismosensitive element 1 in its normal attitude. Terminals 25A and 25B are secured to the receptacle 22A by way of insert molding for electrically connecting between the inside of the casing 23 and the outside thereof. An end of the hook 24 is hung on a support 26 provided in the receptacle 22A so that the seismosensitive element 1 is rockably supported and that the gravity causes the seismosensitive element 1 to assume its normal position.

An amount of a liquid 27 having a selected viscosity, such as silicon oil, is enclosed in the receptacle 22A. A lead wire 28 is connected at one end to the metal plate 4 which is at the same potential as the housing 2 of the seismosensitive element 1 and is further connected at the other end to the terminal 25A. Another lead wire 29 is connected at one end to the terminal pin 6 which is at the same potential as the contact plate 7 and is further connected to the terminal 25B.

The operation of the seismosensitive device 21 will be described. A high level of accuracy is required in mounting the seismosensitive device 11 shown in FIGS. 5, 6. For example, the operating value of the seismosensitive device is reduced about 20 gal when it is mounted only with an inclination of 1 degree. In the seventh embodiment, however, the seismosensitive element 1 is rockably supported on the support 26, so that the position of the seismosensitive element 1 is automatically compensated by the gravity such that the element assumes its normal position, when the mounting angle thereof is within an allowable inclination or within a spare space in which the element 1 can assume the normal position in the space of the casing 23. The viscosity of the liquid 27 is selected so that the seismosensitive element 1 assumes its normal position within a predetermined time period, for example, 20 seconds, after the casing 23 is inclined.

When the seismosensitive element 1 mounted as described above is subjected to oscillations or acceleration, the seismosensitive element 1 is responsive, integrally with the casing 23, to the oscillations with a cycle of 2 to 3 seconds, for example, since the liquid 27 with the selected viscosity is enclosed in the casing 23, which can provide reliable detection.

The seismosensitive device has recently been mounted on a gas meter with an automatic shutoff valve for city gas or commercial propane gas equipment. The body of a person passing by the gas meter or a thing carried by him or her may strike the gas meter or a ball for a ball game may strike the gas meter since the gas meter is usually located outdoors. In such a case, there is a possibility that the seismosensitive element is subjected to noise oscillations. An experiment performed by the inventors shows that an oscillational acceleration of the sinusoidal waveform is applied to the gas meter when the gas meter is subjected to a disturbing oscillation as described above. In this case, the oscillational acceleration reduces from about 1,000 gal in the period of about 0.1 seconds, though the period differs more or less because of the interval of the support positions of metal fixtures. Assume now that the threshold of the seismosensitive device is set at 150 gal and that the microcomputer is programmed so that it determines that an earthquake has occurred, when the "on" and "off" signals each having the period of 40 milliseconds are generated in three cycles or more within three seconds. In this case, the period of the "on" and "off" signals does not reach 40 milliseconds even when the seismosensitive element generates the "on" and "off" signals each having a period of 25 milliseconds. Consequently, the microcomputer does not determine that an earthquake has occurred.

The seismosensitive device is turned on when an equipment on which the seismosensitive device is mounted overturns or inclines upon occurrence of an earthquake before the seismosensitive device responds to the oscillational acceleration. When the on-state continues for one second or more, the same determination is made as that in the case where an earthquake having a predetermined acceleration is detected. When the inclination is, for example, 5 degrees in accordance with the spare space in the casing 23, the seismosensitive element 1 quickly assumes its normal position and the inclined state of the seismosensitive device cannot be detected when the liquid 27 is not enclosed in the casing 23. When the liquid 27 is enclosed in the casing 23, the seismosensitive element 1 is braked by the viscosity of the liquid 27 such that the seismosensitive element 1 gradually returns to its normal position within the predetermined period of time, for example, within 20 seconds upon sudden inclination of the seismosensitive device. Since the "on" period of the signal becomes one second or above, the microcomputer can determine that the equipment on which the seismosensitive device is mounted has been inclined. Consequently, a warning can be given or controlled equipment can be controlled.

Figure 14:
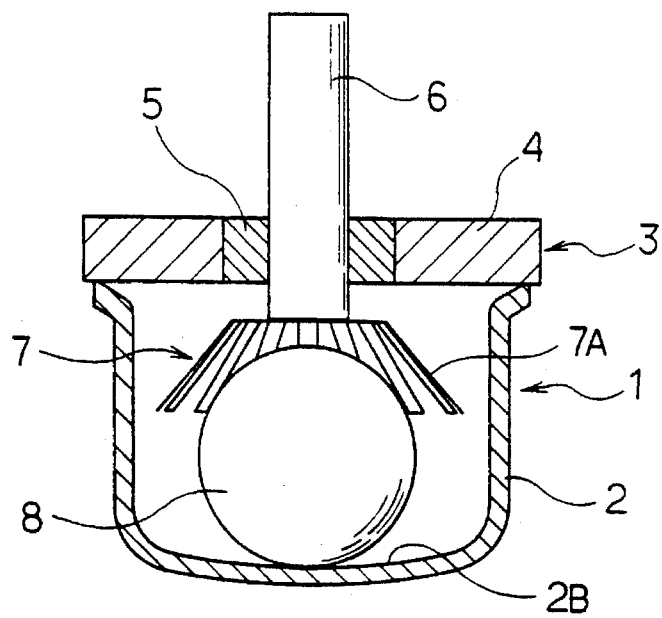
FIG. 14 is a longitudinally sectional view of a modified form of the seismosensitive element of the first embodiment shown in FIG. 1.

In each of the foregoing embodiments, the recess 2A is provided as the rest portion for the inertia ball in the bottom of the housing of the seismosensitive element. However, the rest portion may be eliminated depending upon the working condition of the seismosensitive element, as shown in FIG. 14.

Figure 15:
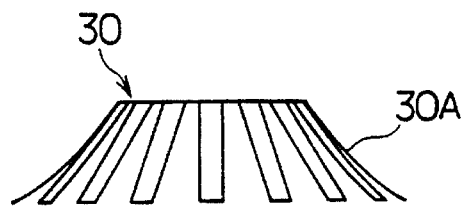
FIGS. 15, 16 and 17 are views of modified forms of the contact plate employed in the seismosensitive element respectively.
Figures 16, 17:
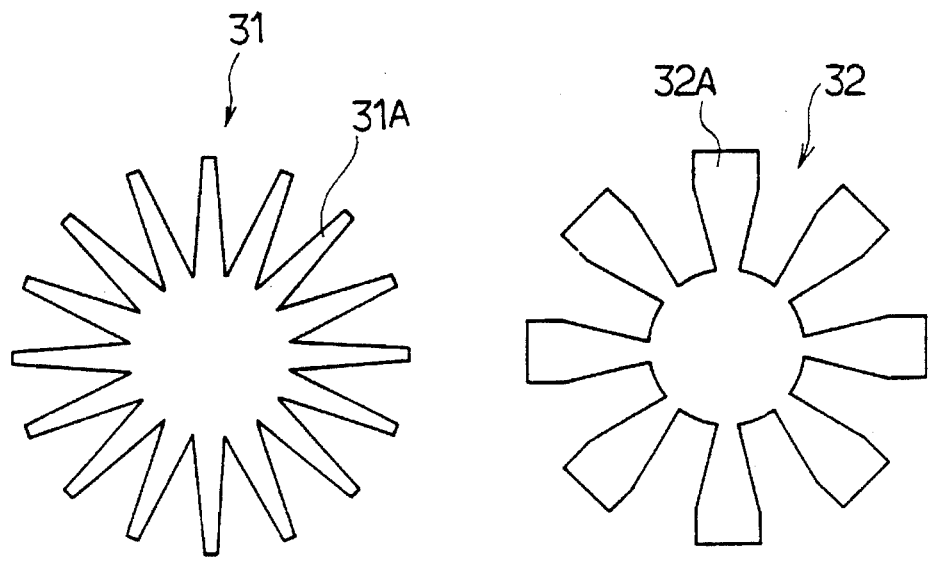

FIGS. 15 to 17 illustrate modified forms of the contact plate. In the contact plate 30 shown in FIG. 15, each feather portion 30A has a distal end curved outwards. In the contact plate 31 shown in FIG. 16, each feather portion 31A has a larger width at its root portion than any other portion thereof since the stress concentrates on the root portion. In the contact plate 32 shown in FIG. 17, each feather portion 32A has a larger width at its distal end than at nay other portion thereof so that the contact between the inertia ball and the contact plate is stabilized.

Figure 18:
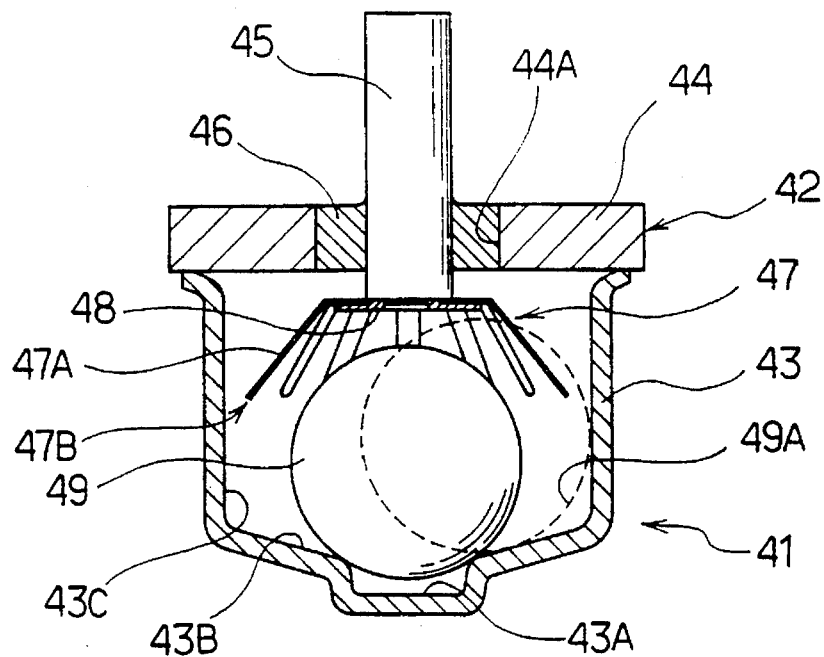
FIG. 18 is a longitudinally sectional view of a tilt switch of an eighth embodiment in accordance with the present invention.
Figure 19:
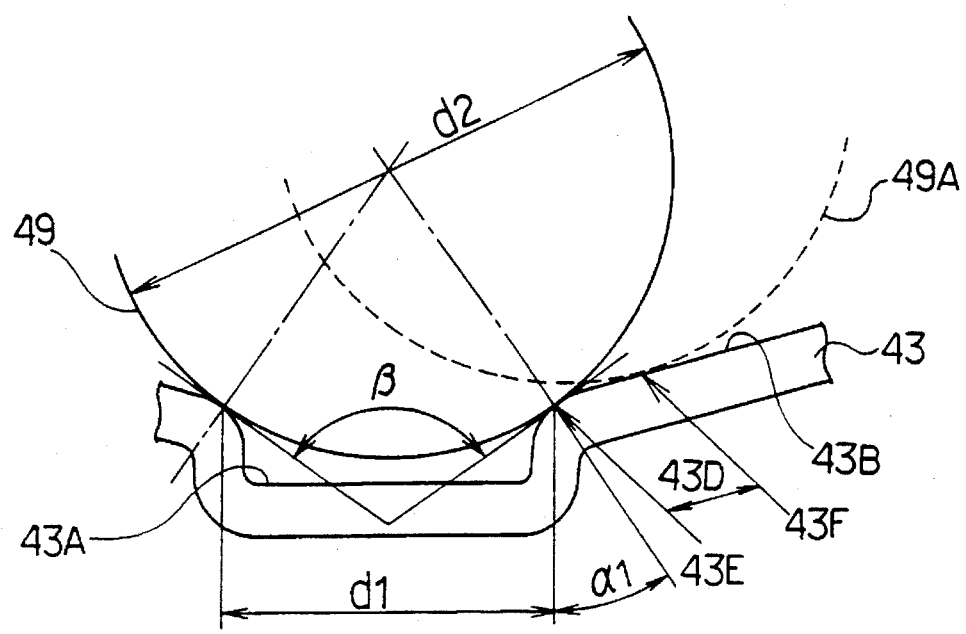
FIG. 19 is a partially enlarged view of a neutral recess of the tilt switch on which an inertia ball rests.

FIGS. 18 and 19 illustrate an eighth embodiment. The invention is applied to a tilt switch in the eighth embodiment. A tilt switch 41 comprises a housing 43 and a header 42 welded to the housing 43. The header 42 is formed of a substantially circular metal plate 44 and has a through aperture 44A formed in its central portion. The conductive terminal pin 45 is inserted through the aperture 44A to be secured therein by the electrically insulative filler 46 such as glass or ceramic.

The contact plate 47 formed of the electrically conductive material is welded to the distal end of the terminal pin 45 at the housing interior side. The contact plate 47 is disposed substantially concentrically with the terminal pin 45. The contact plate 47 has a plurality of feather portions 47A each with a sufficient elasticity. When the contact plate 47 is formed from phosphor bronze and a conductive ball has a mass of 0.7 gram, a suitable thickness of the contact plate 47 is in the range of 0.01 to 0.03 mm and a suitable width of each feather portion 47A is approximately 0.5 mm. A protector 48 formed of a metal having a high rigidity is secured to the side of the contact plate 47 opposite that secured to the terminal pin 45 for the purpose of preventing the permanent deformation of the contact plate 47 due to collision of the conductive ball 49 therewith.

The housing 43 is formed of a conductive material such as a metal into a cylindrical shape and has a bottom. The bottom of the housing 43 has a neutral position holding portion or a neutral recess 43A formed in the central portion thereof and a rolling face 43B around the neutral recess 43A such that the housing bottom is formed into the shape of a shelf. The rolling face 43B is formed in an inclined face rising radially from the central portion. The portion of the inclined face on which the conductive ball rolls has a larger inclination at the radially central side and a smaller inclination at the outer side such that the inclination varies continuously or discontinuously. The solid conductive ball 49 formed of a metal or the like is provided in the housing 43 so as to be positioned at the central neutral recess 43A by the action of the gravity while the tilt switch assumes its normal position and the conductive ball 49 is at rest.

The operation of the tilt switch 41 will now be described. A set operating angle of the tilt switch 41 depends upon a contact angle α1 between the conductive ball 49 and an open edge 43E of the recess 43A. The contact angle α1 depends upon the diameter d1 of the contact portion between the conductive ball 49 and the open edge 43E and the diameter d2 of the conductive ball 49. The contact angle α1 is 35 degrees in the embodiment. When the tilt switch 41 assumes the normal position, the conductive ball 49 is held at the open edge 43E of the neutral recess 43A where it is not in contact with the contact plate 47 and the protector 48 and it is not electrically conducted.

The conductive ball 49 is held at the open edge 43E of the neutral recess 43A until its inclination reaches the set operating angle even when the tilt switch 41 tilts. The conductive ball 49 starts rolling when its inclination exceeds the operating contact angle, 35 degrees in the embodiment. Since the inclination of the rolling face 43B continuous from the open edge 43E is varied as described above, the inclination of the rolling face 43B relative to the horizontal face is decreased as the rolling face 43B goes radially from the center when the set operating angle has been reached. Accordingly, the conductive ball 49 rapidly moves along the rolling face 43B radially to the position shown by dotted line in FIG. 18 when it once starts rolling. When reaching the position 49A, the conductive ball 49 is brought into contact with the feather portions 47A of the contact plate 47, thereby closing an electrical path between the housing 43 and the terminal pin 45. The conductive ball 49 is stabilized at the neutral recess 43A with the open edge 43E when the tilt switch assumes the normal attitude and further stabilized at a position 43F where the inclination of the rolling face 43B relative to the horizontal face is rapidly decreased, when the tilt switch is tilted by the set operating angle. The conductive ball 49 is not stabilized at any position on the rolling face 43D between these points. Accordingly, the switching from the contact to the disengagement between the conductive ball 49 and the contact plate 47 is caused while the conductive ball 49 is rolling between the above-described two points, so that the conductive ball 49 rapidly passes the switching point even when a controlled equipment is slowly tilted. Consequently, an unstable contact state due to unsteady movement of the conductive ball 49 near the set operating angle of the tilt switch can be prevented, which ensures a reliable "on" signal.

Should both of the conductive ball 49 and the contact plate 47 be rigid bodies, these members would repulse each other upon contact of the conductive ball 49 with the contact plate 47. Consequently, chattering is caused between the conductive ball 49 and the contact plate 47. This poses a problem in the actual use of the tilt switch. In the present invention, however, the conductive ball 49 comes into contact with the feather portions 47A each having the sufficient elasticity sliding thereon, so that the kinetic energy of the conductive ball 49 is absorbed by the contact plate 47. Consequently, the chattering due to the repulsion between the conductive ball 49 and the contact plate 47 can be prevented. According to experiments performed by the inventors, it takes no less than one milliseconds for the "off" state to completely shift to the "on" state when the conductive ball 49 has a mass of 0.7 gram and a phosphor bronze plate used for the feather portions of the contact plate 47 has a thickness of 0.015 mm and a width of 0.5 mm. On the other hand, several milliseconds are required when the contact plate has a thickness of 0.2 mm and accordingly has high rigidity.

The contact of the conductive ball 49 with the contact plate 47 is maintained until a set return angle is reached. The conductive ball 49 starts rolling again when the angle of the tilt switch exceeds the set return angle. In contrast with the "on" operation, the inclination of the rolling face 43B relative to the horizontal plane is decreased as the rolling face 43B goes to the center of the housing bottom. Accordingly, the conductive ball 49 rapidly returns to the neutral recess 43A and it reliably gets out contact with the contact plate 47, returning to its initial state at an irreversible point.

In the construction that the conductive ball 49 is held on the open edge 43E of the recess 43A without contact with the bottom of the recess 43A, as described above, a hold angle β between the open edge 43E and the conductive ball 49 needs to be an acute angle when a large operating angle is set. However, it can be considered that the conductive ball 49 is held by the open edge 43E when the hold angle β exceeds a predetermined value and that the variations in the angle at which the conductive ball 49 starts rolling are caused or the conductive ball 49 becomes inoperative. The tilt switch shown as a ninth embodiment in FIG. 20 solves this problem.

Figure 20:
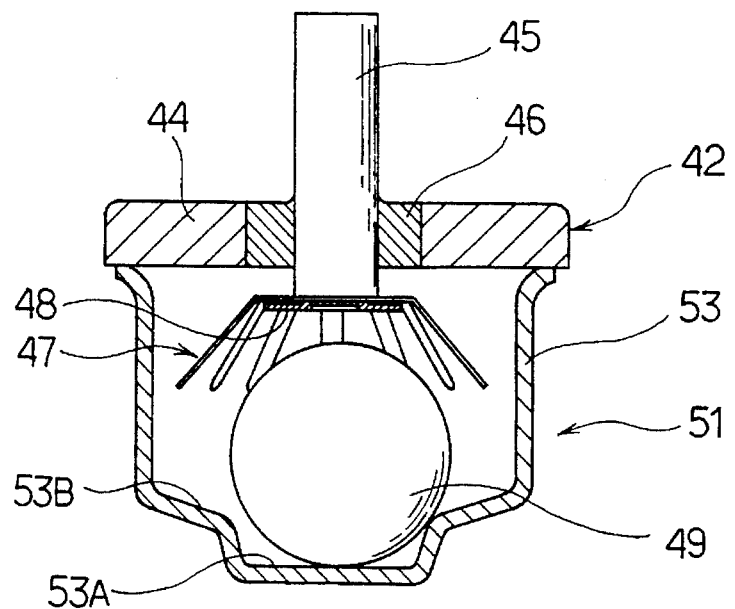
FIG. 20 is a longitudinally sectional view of the tilt switch of a ninth embodiment.

In the tilt switch 51 shown in FIG. 20, the neutral recess 53A is formed so that the conductive ball 49 cannot come into contact with the whole open edge 53E of the recess 53A at once and it rockably abuts against the inner bottom of the recess 53A.

Figure 21:
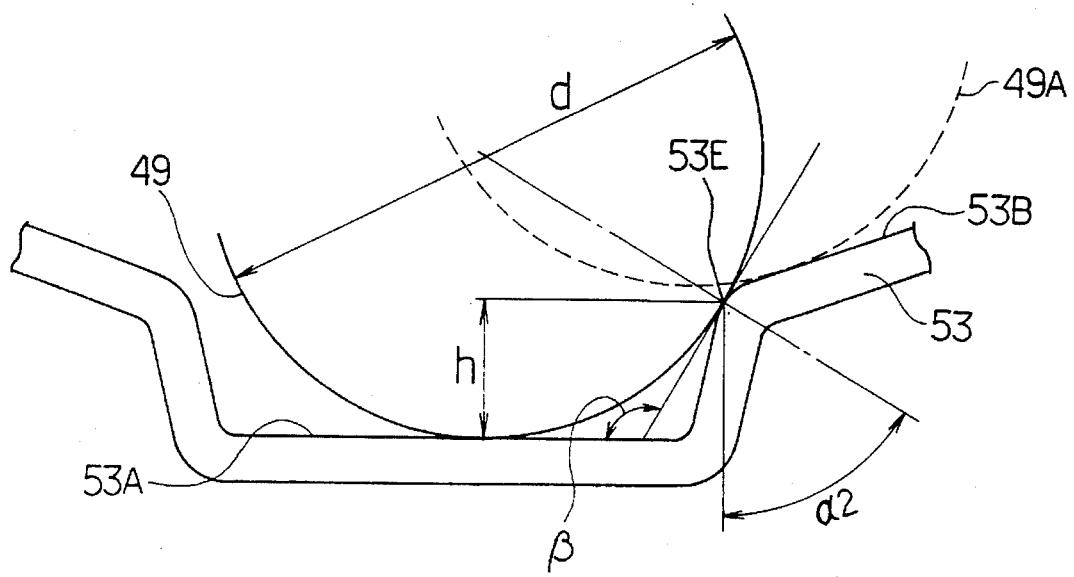
FIG. 21 is a partially enlarged view of the neutral recess of the tilt switch on which the inertia ball rests, in the ninth embodiment.

The operation of the tilt switch 51 will be described. Referring to FIG. 21, the operating angle of the switch 51 depends upon the contact angle α2 of the conductive ball at the contact point of the open edge 53E with the conductive ball 49 where the reference symbol h refers to the height from the bottom of the neutral recess 53A to the contact point of the open edge 53E with the conductive ball 49. The contact angle α2 depends upon the diameter d of the conductive ball 49. In the embodiment, the contact angle α2 is 65 degrees when the tilt switch assumes the normal position. When the tilt switch is in the normal position, the conductive ball 49 can roll so far as it is in contact with the bottom of the recess 53A. Furthermore, the distance of free movement of the conductive ball 49 is set so that it is not brought into contact with the contact plate 47 or the protector 48.

Upon tilt of the tilt switch 51, the gravity causes the conductive ball 49 to move in the neutral recess 53A such that it comes into contact with a portion of the open edge 53E. The conductive ball 49 remains in this position until the inclination of the tilt switch 51 reaches the set operating angle. When the inclination of the tilt switch 51 exceeds the set operating angle, the conductive ball 49 gets over the open edge 53E of the neutral recess 53A and then, rapidly moves on the rolling face 53B to the position shown by the dotted line in FIG. 21, whereby the conductive ball 49 comes into contact with the contact plate 47 to close the electrical path between the housing 53 and the terminal pin 45. Accordingly, the unstable contact state due to unsteady movement of the conductive ball 49 near the set operating angle of the tilt switch can be prevented as in the above-described tilt switch 41 and provision of a reliable "on" signal can be ensured.

Furthermore, a gap is reserved between the conductive ball 49 and the open edge 53E of the neutral recess 53A when it occupies the central portion of the bottom of the neutral recess 53A while the tilt switch is in its normal position. Consequently, the hold angle β between the conductive ball 49 and the open edge 53E is increased in the tilt switch 51 as compared with the switch 41 which is set at the same operating angle with of the switch 51 and wherein the conductive ball 49 is restricted by the whole open edge 53E of the neutral recess 53A. Thus, the restricting force against the conductive ball 49 is reduced, which can maintain the stable operating angle. Additionally, the conductive ball 49 can be prevented from being held in the recess 53A since the hold angle β is large even in the tilt switch having a large operating angle.

In the tilt switches as far as described above, the conductive ball rests on the substantially central portion of the contact plate 7 out of contact with the housing when the tilt switch is tilted 180 degrees relative to the normal position or is turned upside down. Consequently, there is a possibility that the "on" signal cannot be generated even when the controlled equipment is turned over.

Figure 22:
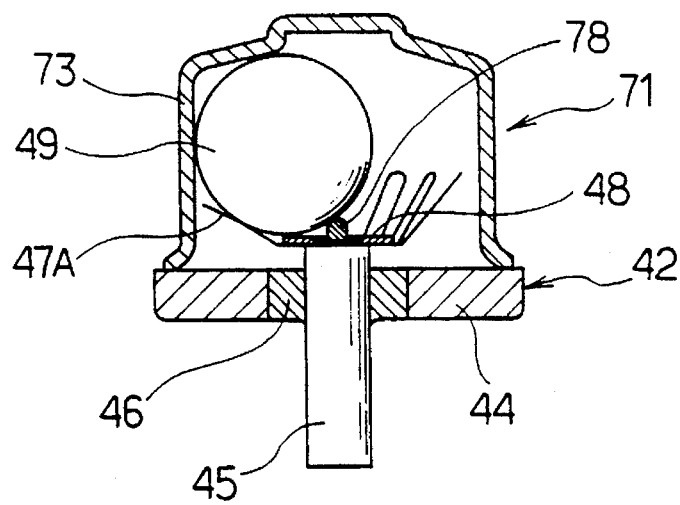
FIG. 22 is a longitudinally sectional view of the tilt switch of a tenth embodiment in its inverted state.
Figure 23:
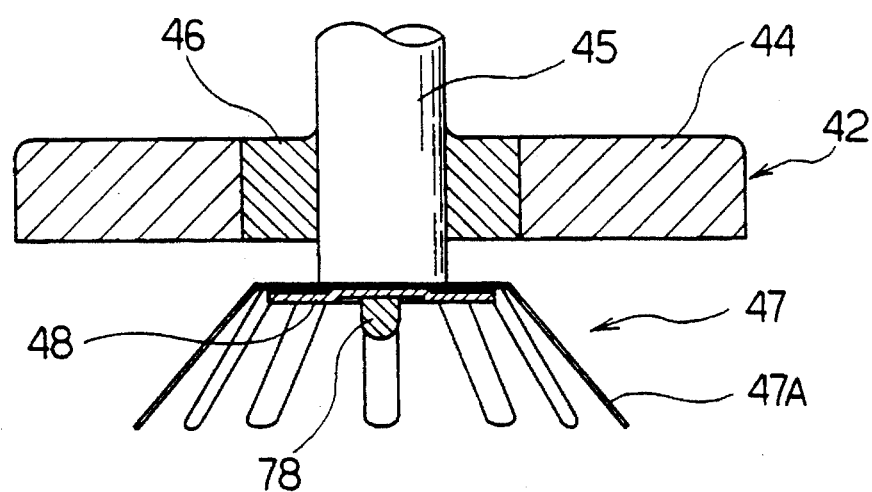
FIG. 23 is a partially enlarged view of the tilt switch, showing a header having a terminal pin to one of which ends the contact plate is fixed.

A tenth embodiment shown in FIGS. 22 and 23 is directed to a solution of the above-described problem. A projection 78 is secured on the central portion of the protector 48, as shown in FIG. 23. The dimensions of a projection 78 are set so that it does not engage the conductive ball 49 when the latter is at rest while the tilt switch is in its normal position and when the conductive ball 49 normally rolls. The projection 78 may be formed integrally with the contact plate 47 or the protector 48.

The tilt switch 71 provided with the projection 78 operates in the same manner as the above-described tilt switches, when it assumes its normal position and when it is normally tilted or turned over. When the housing of the tilt switch 71 is turned upside down, the conductive ball 49 undergoes, from the projection 78, a composite force acting outwards from the center such that the conductive ball 49 moves onto the feather portions 47A of the contact plate 47 and comes into contact with the inner wall of the housing 73. Consequently, the "on" signal can reliably be generated even when the switch housing is turned upside down.

Figures 24, 25:
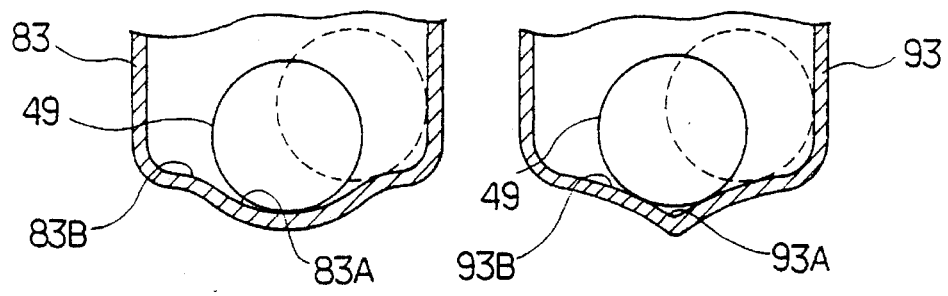
FIGS. 24, 25 and 26 are views of modified forms of a housing of the tilt switch respectively.
Figure 26:
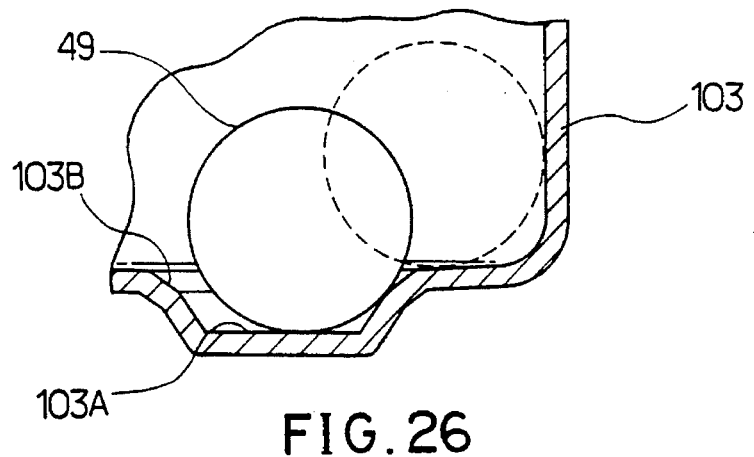

In the foregoing embodiments, the conductive ball is prevented from rolling by the open edge of the neutral recess until the inclination of the tilt switch reaches the predetermined angle. The shape of the housing bottom may be deformed into those shown in FIGS. 24 to 26, provided that the conductive ball comes into contact with the contact plate until the operating angle of the tilt switch is reached. The bottom of the housing 83 shown in FIG. 24 has a concave curved face with a radius of curvature larger than that of the conductive ball 49, and the rolling face 83B continuous from the concave curved face is formed into a convex curved face with a radius of curvature larger than that of the conductive ball 49.

FIG. 25 shows the neutral recess 93A having a bottom formed into a conical face. In FIG. 26, a linear face is provided discontinuously between the neutral recess 103A and the rolling face.

Figure 27:
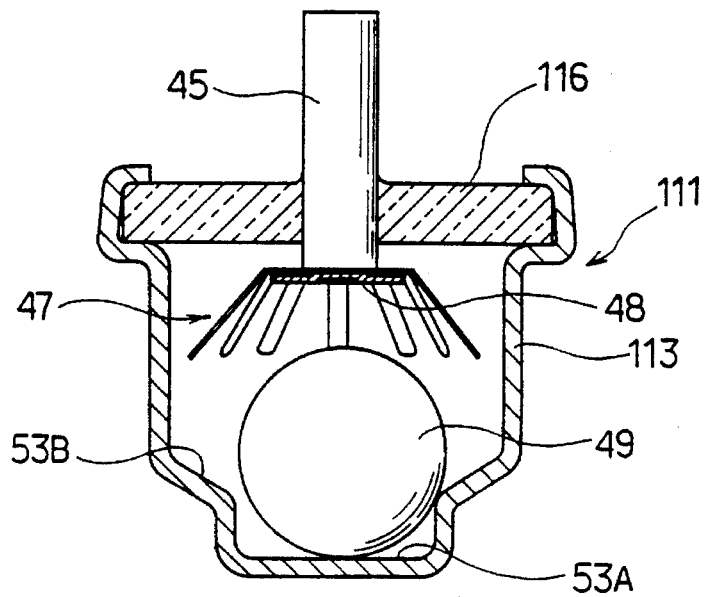
FIG. 27 is a longitudinally sectional view of the tilt switch of an eleventh embodiment.

FIG. 27 illustrates an eleventh embodiment of the invention. In the tilt switch 111 shown in FIG. 27, the header 116 of the housing 113 is formed from an electrically insulating material and the terminal pin 45 is directly secured in the aperture of the header 116. In this construction, the terminal pin 45 is directly secured in the header 116 in substantially the electrically insulative state. Furthermore, since the housing 113 is formed from the metal and the inorganic electrically conductive material such as glass or ceramics, occurrence of an organic contaminant causing failure in electrical conduction between the contacts can be prevented as compared with the case where the housing is formed from a synthetic resin. Additionally, the housing 113 is more rigid and cost-effective than that formed only from the glass or ceramics.

The foregoing disclosure and drawings are merely illustrative of the principles of the present invention and are not to be interpreted in a limiting sense. The only limitation is to be determined from the scope of the appended claims.

We claim:

1. A rolling or tilting responsive switch comprising:

a) a housing formed from an electrically conductive material and having a bottom and an open end, the housing having in the bottom a central neutral recess and a rolling face around the recess such that the bottom is formed into the shape of a shelf;

b) a header fixed to the housing to close the open end thereof and having a through-aperture in which an electrically conductive terminal pin is fixed in an insulated relation with the header;

c) a contact member formed from an electrically conductive material and fixed to an end of the terminal pin located inside the housing, the contact member having a contact portion disposed concentrically with the terminal pin and a plurality of feather portions each having a predetermined elasticity; and d) an inertia ball enclosed in the housing to be located at the recess of the housing bottom in a normal attitude thereof in a stationary state by gravity such that the inertia ball is prevented from being brought into contact with the contact member, the rolling face of the bottom of the housing being formed so that the same rises concentrically outwardly from the center of the bottom thereof and so that a gradient thereof is decreased, the inertia ball being prevented from rolling on the rolling face of the housing bottom by the neutral recess thereof until the housing is tilted by a predetermined angle, thereby being disallowed to come into contact with the contact member, the inertia ball being allowed to depart the neutral recess to thereby roll on the rolling face when the housing is tilted above the predetermined angle, so that the inertia ball is brought into contact with the contact member, thereby electrically connecting the contact member to the housing.

2. A rolling or tilting responsive switch according to claim 1, wherein the neutral recess has such a dimension that the inertia ball is allowed to roll on the housing bottom in a range defined by a peripheral wall of the neutral recess in a normal state of the inertia ball.

3. A rolling or tilting responsive switch according to claim 1, wherein the header seals the housing.

4. A rolling or tilting responsive switch according to claim 2, wherein the contact member is brought into contact with the inertia ball except for a distal end thereof.

5. A rolling or tilting responsive switch according to claim 1, wherein the header seals the housing and a pollution preventing gas is contained in the sealed housing.

6. A rolling or tilting responsive switch comprising:
   a) a housing formed from an electrically conductive material and having a bottom and an open end, the housing having in the bottom a central neutral recess and a rolling face around the recess such that the bottom is formed into the shape of a shelf;
   b) a header fixed to the housing to close the open end thereof and having a through-aperture in which an electrically conductive terminal pin is fixed in an insulated relation with the header;
   c) a contact member formed from an electrically conductive material and fixed to an end of the terminal pin located inside the housing, the contact member having a contact portion disposed concentrically with the terminal pin;
   d) an inertia ball enclosed in the housing to be located at the recess of the housing bottom in a normal attitude thereof in a stationary state by gravity such that the inertia ball is prevented from being brought into contact with the contact member, the rolling face of the bottom of the housing being formed so that the same rises concentrically outwardly from the center of the bottom thereof and so that a gradient thereof is decreased, the inertia ball being prevented from rolling on the rolling face of the housing bottom by the neutral recess thereof until the housing is tilted by a predetermined angle, thereby being disallowed to come into contact with the contact member, the inertia ball being allowed to depart the neutral recess to thereby roll on the rolling face when the housing is tilted above the predetermined angle, so that the inertia ball is brought into contact with the contact member, thereby electrically connecting the contact member to the housing; and
   e) a protector provided in the vicinity of a portion of the terminal pin where the contact member is secured and having a predetermined rigidity for preventing permanent deformation of the contact member due to collision with the inertia ball.

7. A rolling or tilting responsive switch according to claim 6, wherein the neutral recess has such a dimension that the inertia ball is allowed to roll on the housing bottom in a range defined by a peripheral wall of the neutral recess in a normal state of the inertia ball.

8. A rolling or tilting responsive switch according to claim 6, wherein the header seals the housing.

9. A rolling or tilting responsive switch according to claim 6, wherein the header seals the housing and a pollution preventing gas is contained in the sealed housing.

10. A rolling or tilting responsive switch according to claim 6, wherein the contact member is brought into contact with the inertia ball except for a distal end thereof.

11. A rolling or tilting responsive switch comprising:
   a) a housing formed from an electrically conductive material and having a bottom and an open end, the housing having in the bottom a central neutral recess and a rolling face around the recess such that the bottom is formed into the shape of a shelf;
   b) a header fixed to the housing to close the open end thereof for sealing the housing and having a through-aperture in which an electrically conductive terminal pin is fixed in an insulated relation with the header;
   c) a contact member formed from an electrically conductive material and fixed to an end of the terminal pin located inside the housing, the contact member having a contact portion disposed concentrically with the terminal pin; and
   d) an inertia ball enclosed in the housing to be located at the recess of the housing bottom in a normal attitude thereof in a stationary state by gravity such that the inertia ball is prevented from being brought into contact with the contact member, the rolling face of the bottom of the housing being formed so that the same rises concentrically outwardly from the center of the bottom thereof and so that a gradient thereof is decreased, the inertia ball being prevented from rolling on the rolling face of the housing bottom by the neutral recess thereof until the housing is tilted by a predetermined angle, thereby being disallowed to come into contact with the contact member, the inertia ball being allowed to depart the neutral recess to thereby roll on the rolling face when the housing is tilted above the predetermined angle, so that the inertia ball is brought into contact with the contact member, thereby electrically connecting the contact member to the housing;
   wherein a surface treatment is applied to a surface of the inertia ball and at least a portion of each of the contact member and the inner surface of the housing with which portion the inertia ball comes into contact, for permitting electrical conduction of the inertia ball and preventing said portion of each of the contact member and the inner surface of the housing from being damaged by an atmosphere in which the device is used.

12. A rolling or tilting responsive switch according to claim 11, wherein the neutral recess has such a dimension that the inertia ball is allowed to roll on the housing bottom in a range defined by a peripheral wall of the neutral recess in a normal state of the inertia ball.

13. A rolling or tilting responsive switch according to claim 11, wherein the header seals the housing.

14. A rolling or tilting responsive switch according to claim 11, wherein the header seals the housing and a pollution preventing gas is contained in the sealed housing.

15. A rolling or tilting responsive switch according to claim 11, wherein the contact member is brought into contact with the inertia ball except for a distal end thereof.

16. A rolling or tilting responsive switch comprising:
   a) a housing formed from an electrically conductive material and having a bottom and an open end, the housing having in the bottom a central neutral recess and a rolling face around the recess such that the bottom is formed into the shape of a shelf;

b) a header fixed to the housing to close the open end thereof for sealing the housing and having a through-aperture in which an electrically conductive terminal pin is fixed in an insulated relation with the header;

c) a contact member formed from an electrically conductive material and fixed to an end of the terminal pin located inside the housing, the contact member having a contact portion disposed concentrically with the terminal pin;

d) an inertia ball enclosed in the housing to be located at the recess of the housing bottom in a normal attitude thereof in a stationary state by gratuity such that the inertia ball is prevented from being brought into contact with the contact member, the rolling face of the bottom of the housing being formed so that the same rises concentrically outwardly from the center of the bottom thereof and so that a gradient thereof is decreased, the inertia ball being prevented from rolling on the rolling face of the housing bottom by the neutral recess thereof until the housing is tilted by a predetermined angle, thereby being disallowed to come into contact with the contact member, the inertia ball being allowed to depart the neutral recess to thereby roll on the rolling face when the housing is tilted above the predetermined angle, so that the inertia ball is brought into contact with the contact member, thereby electrically connecting the contact member to the housing; and e) a pollution preventing gas contained in the sealed housing.

17. A rolling or tilting responsive switch according to claim 16, wherein the neutral recess has such a dimension that the inertia ball is allowed to roll on the housing bottom in a range defined by a peripheral wall of the neutral recess in a normal state of the inertia ball.

18. A rolling or tilting responsive switch according to claim 16, wherein the contact member is brought into contact with the inertia ball except for a distal end thereof.

* * * * *